United States Patent
Sato et al.

(10) Patent No.: US 10,981,835 B2
(45) Date of Patent: *Apr. 20, 2021

(54) "MXENE" PARTICULATE MATERIAL, SLURRY, SECONDARY BATTERY, TRANSPARENT ELECTRODE AND PRODUCTION PROCESS FOR "MXENE" PARTICULATE MATERIAL

(71) Applicant: ADMATECHS CO., LTD., Miyoshi (JP)

(72) Inventors: Kimitoshi Sato, Miyoshi (JP); Yusuke Watanabe, Miyoshi (JP); Nobutaka Tomita, Miyoshi (JP); Akihiko Suda, Nagakute (JP); Tatsuo Fukano, Nagakute (JP)

(73) Assignee: ADMATECHS CO., LTD., Miyoshi (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/822,176

(22) Filed: Mar. 18, 2020

(65) Prior Publication Data
US 2020/0231507 A1  Jul. 23, 2020

Related U.S. Application Data

(63) Continuation of application No. PCT/JP2018/048448, filed on Dec. 28, 2018.

(51) Int. Cl.
*C04B 35/56* (2006.01)
*H01M 4/1393* (2010.01)
(Continued)

(52) U.S. Cl.
CPC ...... *C04B 35/5618* (2013.01); *C04B 35/6261* (2013.01); *C04B 35/62625* (2013.01);
(Continued)

(58) Field of Classification Search
CPC .......... C04B 35/5618; H01M 4/1393
See application file for complete search history.

(56) References Cited

U.S. PATENT DOCUMENTS 10,573,768 B2 * 2/2020 Ghidiu ............... H01L 33/42
2013/0052438 A1 2/2013 Hu et al.
(Continued)

FOREIGN PATENT DOCUMENTS

CN 102933519 A 2/2013
CN 102933519 B 9/2014
(Continued)

OTHER PUBLICATIONS

Taiwanese Office Action dated Apr. 13, 2020, in Patent Application No. 108135981, 6 pages (with unedited computer generated English translation).
(Continued)

*Primary Examiner* — Karl E Group
(74) *Attorney, Agent, or Firm* — Oblon, McClelland, Maier & Neustadt, L.L.P.

(57) ABSTRACT

A particulate material with a composition expressed by $M_aAl_bX_c$ in which "M" includes one or more elements selected from the group consisting of Ti, V, Cr, Zr, Nb, Mo, Hf and Ta and "X" includes C or one or more chemical structures selected from the group consisting of $C_{(1.0-x)}N_x$ (where "x" is $0<"x"\leq 1.0$), wherein: "a" is two or three; "b" is more than 0.02; and "c" is from 0.8 to 1.2 when "a" is two; or "c" is from 1.8 to 2.6 when "a" is 3. The particulate material has thicknesses whose average value is from 3.5 nm or more to 20 nm or less, and sizes, [{(longer sides)+(shorter sides)}/2], whose average value is from 50 nm or more to 300 nm or less.

9 Claims, 12 Drawing Sheets

(51) Int. Cl.
  *H01M 4/583*     (2010.01)
  *C04B 35/626*    (2006.01)
(52) U.S. Cl.
  CPC ......... *H01M 4/1393* (2013.01); *H01M 4/583* (2013.01); *C04B 2235/3843* (2013.01); *C04B 2235/5445* (2013.01); *C04B 2235/5454* (2013.01); *C04B 2235/77* (2013.01)

(56) References Cited

U.S. PATENT DOCUMENTS

| 2016/0301096 A1 | 10/2016 | Zhamu et al. |
| 2017/0088429 A1 | 3/2017  | Shin et al. |
| 2017/0294546 A1 | 10/2017 | Ghidiu et al. |

FOREIGN PATENT DOCUMENTS

| CN | 105720246 A | 6/2016 |
| CN | 106430195 A | 2/2017 |
| CN | 107973920 A | 5/2018 |
| CN | 108615614 A | 10/2018 |
| CN | 107230560 B | 11/2018 |
| JP | H11-279745 A | 10/1999 |
| JP | 2016-063171 A | 4/2016 |
| JP | 2017-076739 A | 4/2017 |
| WO | WO 2011/136136 A1 | 11/2011 |

OTHER PUBLICATIONS

International Search report dated Mar. 12, 2019, in PCT/JP2018/048448, filed Dec. 28, 2018 (with English Translation).
Written Opinion of International Search Report dated Mar. 12, 2019 in PCT/JP2018/048448 (with English Translation).
Notification of Reasons for Refusal dated Jun. 11, 2019, in Japanese Patent Application No. 2019-522342 (w/ Computer-generated English translation).
Decision to Grant dated Jul. 18, 2019, in Japanese Patent Application No. 2019-522342 (w/ Computer-generated English translation).
Combined Chinese Office Action and Search Report dated Aug. 4, 2020 in Chinese Patent Application No. 201880034497.5 (with unedited computer generated English translation), 19 pages.

\* cited by examiner (a) State Being Subjected to Ultrasonic Irradiation (b) Supernatant Liquid after Left Alone Naturally for 48 Hours following Ultrasonic Irradiation
(Thickness : 4.2 nm with AFM ;
Size : 26.7 nm with AFM)

(c) Deposits after Left Alone Naturally for 48 Hours following Ultrasonic Irradiation
( 0.386 $\mu$m with SEM)

(a) Visual Observation  (b) SEM Image

"MXENE" PARTICULATE MATERIAL, SLURRY, SECONDARY BATTERY, TRANSPARENT ELECTRODE AND PRODUCTION PROCESS FOR "MXENE" PARTICULATE MATERIAL

CROSS REFERENCE TO RELATED APPLICATIONS

The present application is a Continuation Application of International Application No. PCT/JP2018/048448, filed on Dec. 28, 2018, the entire contents of which are incorporated herein by reference.

BACKGROUND OF THE INVENTION

1. Field of the Invention

The present invention relates to a particulate material and a production process for the same, as well as a slurry, secondary battery and transparent electrode comprising the particulate material.

2. Description of the Related Art

Conventionally, a particulate material comprising an "MXene" intercalation compound, which is obtained by removing Al from an "MAX"-phase ceramic powder, such as $Ti_3AlC_2$, one of intercalation compounds, by means of an acidic treatment, has been known (see Japanese Unexamined Patent Publication (KOKAI) Gazette No. 2016-63171, Japanese Patent Publication (KOKAI) Gazette No. 2017-76739, United States Laid-open Patent Publication No. 2017/0294546, and United States Laid-open Patent Publication No. 2017/0088429). The particulate material will be hereinafter referred to as an "'MXene' particulate material" whenever appropriate, or will be simply referred to as a "particulate material." It has been expected to apply the "MXene" intercalation compounds to an ingredient for negative-electrode active material for secondary battery (or storage battery), because they are able to store/eliminate sodium ions or lithium ions in the gap layers from which the aluminum layers are removed. Moreover, it has been expected to apply the "MXene" intercalation compounds to a material for transparent electric conducting film, for instance, because they are good in the electric conductive property.

"MAX"-phase ceramics are intercalation compounds whose general formula is expressed by $M_{n+1}AX_n$. The formula is configured as follows: "M" is a transition metal, such as Ti, Sc, Cr, Zr or Nb; "A" is an "A"-group element, such as Al, Si, Ga or Ge; "X" is carbon (C) or $C_{(1.0-x)}N_x$ (where $0 < \text{"x"} \leq 1.0$); and "n" is from one to three.

When one of the intercalation compounds with the general formula whose "A" is configured as aluminum (Al), the Al layers are removed selectively by an acidic treatment, because the bonding of "M"-"A" or "A"-"X" is weaker than the bonding of "M"-"X." It has been tried to utilize the "MAX"-phase ceramics for such industrial applications as an ingredient for negative-electrode active material for secondary battery, electromagnetic wave absorbers and gas separation membranes by immersing them in an HF aqueous solution, or an (LiF+HCl) aqueous solution or (KF+HCl) aqueous solution, whose temperature is from 35° C. to 45° C., for 15 to 30 hours, thereby dissolving the Al layers completely; and then turning water-washed deposits (or "MXene" clay) into a film with a three-membered roller.

Moreover, it has been reported that the production of an "MXene" particulate material having a flaky form in which exfoliation has been developed between the layers is made possible by irradiating a water-washed deposit (or "MXene" clay) with ultrasonic waves after substituting an alcohol, such as ethanol, for washing water, and then collecting the resultant clear supernatant liquid. It has been tried to utilize the resulting "MXene" particulate material for an ingredient for negative-electrode active material for secondary battery, and for a material for transparent electric conducting film.

It is essential for certain applications to use a slurry in which a uniformly exfoliated "MXene" particulate material is dispersed highly in an organic solvent. According to related art, the exfoliation has been carried out by ultrasonic irradiation after subjecting an "MAX"-phase ceramic powder to an acidic treatment to completely remove the Al layers and then substituting an organic solvent for acid and water used in the acidic treatment. When irradiating an organic solvent with an ultrasonic wave, cavitation occurs. Crushing action of the cavitation leads to a mechanism in which powdery bodies collide with each other, thereby developing the exfoliation of layers that form an intercalation compound.

However, the exfoliation of layers is developed only partially even by using water in which cavitation is likely to occur. Moreover, using water poses such another problem as an "MXene" particulate material is oxidized in some of the surface to exhibit increased electric resistance.

Moreover, certain applications require to carry out ultrasonic irradiation in an organic solvent in which cavitation is less likely to occur.

Moreover, according to another related art, the "MAX"-phase ceramic powder has been immersed in an HF aqueous solution, or in a (fluoride salt+hydrochloric acid) mixture warmed at from 35° C. to 45° C. for from 15 hours to 30 hours. Investigations by the present inventors found that the conventional immersion allows removing the Al layers completely and permits exfoliating the powder up to a few layers in a unit cell. Meanwhile, however, the powder was found to be oxidized in some of the surface to result in increasing the electric resistance. Another dedicated investigation by the present inventors found that the production of an "MXene" particulate material with low resistance is made possible by immersing the "MAX"-phase ceramic powder in a (fluoride salt+hydrochloric acid) aqueous solution with a temperature of from 20° C. to 30° C. for from 12 hours to 30 hours, although some of the Al layers remain. The produced "MXene" particulate material, however, was associated with such a problem that it could hardly be exfoliated by conventional exfoliation methods like the ultrasonic irradiation.

SUMMARY OF THE INVENTION

The present invention has been completed in view of the aforementioned circumstances. It is therefore an object of the present invention to provide a flaky intercalation-compound "MXene" particulate material which is applicable to an ingredient for negative-electrode active material for secondary battery, transparent electric conducting films, electrically conductive fillers, electromagnetic wave absorbers and gas separation membranes, for instance, and which is of good flexibility and exhibits electric conductivity; and a production process for the same; as well as a slurry, ingredient for negative-electrode active material for secondary battery and transparent electrode comprising the particulate material.

The inventors of the present invention investigated wholeheartedly for the purpose of achieving the aforementioned object, and obtained the following knowledge. That is, they discovered that producing a particulate material having a predetermined composition and exhibiting a predetermined thickness and size by means of adjusting the production conditions allows the provision of a particulate material that is able to form an ingredient for negative-electrode active material for secondary battery capable of storing/eliminating sodium ions and lithium ions and electrodes provided with enhanced performance like high bendability.

When applying an "MXene" particulate material, one of intercalation compounds, to an electrode, and the like, it is necessary to turn its shape from the powdery body into a flaky powdery/particulate body. If such is the case, the intercalation compound has a large interlayer distance that is formed between the gap layers crystal-structurally when its Al layers are removed. Thus, the resulting "MXene" particulate material comes to be provided with electric characteristics allowing its application to an ingredient for negative-electrode active material for secondary battery, as disclosed in Japanese Unexamined Patent Publication (KOKAI) Gazette No. 2016-63171, Japanese Patent Publication (KOKAI) Gazette No. 2017-76739, United States Laid-open Patent Application No. 2017/0294546, and United States Laid-open Patent Application No. 2017/0088429. Moreover, turning an "MXene" particulate material into flaky ones by exfoliation allows it to solidly make face contact with powder-body faces. Consequently, it is necessary to turn an "MXene" particulate material into a flaky powdery/particulate body by exfoliation while letting it retain the layered structure having gap layers which provide a large interlayer distance formed between them by removing the Al layers crystal-structurally.

Moreover, related art has been employed a method of irradiating a powdery "MXene" intercalation compound with ultrasonic waves in a liquid as a method of turning the powdery "MXene" intercalation compound into a flaky intercalation compound by exfoliating the powdery "MXene" intercalation compound, as disclosed in United States Laid-open Patent Application No. 2017/0294546. The ultrasonic irradiation collides the constituents of an intercalation compound powder with each other, thereby allowing the intercalation compound to be exfoliated extremely thinly. Then, a method like centrifugal separation permits one to take out a flaky powdery/particulate body. Employing a general pulverizing operation as a production process for flaky powdery/particulate body did not allow flaky fragments to be exfoliated from a powdery intercalation compound, but had only produced powdery intercalation-compound particles whose particulate diameter was made smaller down to just about 1 μm.

The present invention has been completed based on the discovery that carrying out bead milling using beads with a micro-fine size of from 10 μm to 300 μm allows flakes to be exfoliated down to a predetermined range in thickness and size free of performing any classifying operation by ultrasonic irradiation for taking out some of the flakes, thereby enabling one to provide a particulate material appropriate for an ingredient for negative-electrode active material for secondary battery, and for a material for transparent electrode. A ball mill or bead milling, which is carried out conventionally using beads or balls with a size beyond 300 μm, had only produced powder-shaped intercalation-compound powdery/particulate bodies having 1 μm approximately in size, but the conventional ball mill or bead milling has not been made it possible to flakily exfoliate particles. Moreover, letting aluminum (Al) elements remain in a predetermined amount in a particulate material, which makes a flaky intercalation compound, permitted the inhibition of increased electric resistance resulting from surface oxidation.

(I) A particulate material according to the present invention achieving the aforementioned object makes a particulate material with a composition expressed by $M_aAl_bX_c$ in which "M" includes one or more elements selected from the group consisting of Ti, V, Cr, Zr, Nb, Mo, Hf and Ta and "X" includes C or one or more chemical structures selected from the group consisting of $C_{(1.0-x)}N_x$ (where "x" is 0<"x"≤1.0), wherein: "a" is two or three; "b" is more than 0.02; and "c" is from 0.8 to 1.2 when "a" is two; or "c" is from 1.8 to 2.6 when "a" is three; and the particulate material has thicknesses whose average value is from 3.5 nm or more to 20 nm or less, and sizes, [{(longer sides)+(shorter sides)}/2], whose average value is from 50 nm or more to 300 nm or less. Having the above-described composition, sizes and thicknesses allows the present particulate material to exhibit low electric resistance, and permits it to make an effective ingredient for negative-elect rode active material for secondary battery, and for an effective material for transparent electrode. The present invention disclosed in above (I) enables one to discretionally combine one or more of constituent elements according to following (II) through (IV).

(II) The present particulate material, wherein:
"M" includes Ti; and the composition satisfies any one of following (1) through (4):
(1) "X" includes C, "a"=2, 0.65≥"b"≥0.03, and 1.2≥"c"≥0.8;
(2) "X" includes $C_{(1.0-x)}N_x$ (where "x" is 0<"x"≤1.0), "a"=2, 0.65≥"b"≥0.03, and 1.2≥"c"≥0.8;
(3) "X" includes C, "a"=3, 0.65≥"b"≥0.03, and 2.6≥"c"≥1.8; and
(4) "X" includes $C_{(1.0-x)}N_x$ (where "x" is 0<"x"≤1.0), "a"=3, 0.65≥"b"≥0.03, and 2.6≥"c"≥1.8.

(III) The present particulate material is preferably turned into a powder compact whose surface resistance is from 0.1Ω/□ or more to 300Ω/□ or less. The present particulate material can be turned into a powder compact exhibiting the surface resistance under the conditions of: making a pellet of the present particulate material at 0.5 kg/cm² with a ϕ12-mm mold; processing the pellet into a pelletized powder compact at three ton/cm² by cold isostatic pressing (or CIP); and measuring the pelletized powder compact for surface resistance by a four-terminal method using a 0.1-mm copper wire.

(IV) The present particulate material, wherein: "M" includes Ti; and the particulate material satisfies any one of following (1) and (2):
(1) "X" includes C, and the particulate material has a true density of from 3.36 g/cm³ to 3.50 g/cm³ when "a" is two, or has a true density of from 3.70 g/cm³ to 4.45 g/cm³ when "a" is three; and
(2) "X" includes $C_{(1.0-x)}N_x$ (where "x" is 0<"x"≤1.0), and the particulate material has a true density of from 3.36 g/cm³ to 3.50 g/cm³ when "a" is two, or has a true density of from 3.70 g/cm³ to 4.45 g/cm³ when "a" is three.

(V) A slurry according to the present invention achieving the aforementioned object comprises:
the above-described particulate material; and
a liquid organic material dispersing the particulate material;

wherein the particulate material exhibits from 50 nm or more to 500 nm or less in D50 diameter by volume percentage in a particle size distribution when measured in the organic material.

(VI) A secondary battery according to the present invention achieving the aforementioned object comprises: the above-described particulate material serving as an electrode active-material ingredient.

(VII) A transparent electrode according to the present invention achieving the aforementioned object comprises: the above-described particulate material serving as an electrical conducting material.

(VIII) A production process for particulate material according to the present invention achieving the aforementioned object comprises:

an exfoliation step of producing by an exfoliation process with a bead mill using beads from 10 μm to 300 μm in size a particulate material, which has thicknesses whose average value is from 3.5 nm or more to 20 nm or less, and sizes, [{(longer sides)+(shorter sides)}/2], whose average value is from 50 nm or more to 300 nm or less, from a raw material with a composition expressed by $M_aAl_bX_c$ in which "M" includes one or more elements selected from the group consisting of Ti, V, Cr, Sc, Zr, Nb, Mo, Hf and Ta and "X" includes C or one or more chemical structures selected from the group consisting of $C_{(1.0-x)}N_x$ (where "x" is 0<"x"≤1.0), wherein:

"a" is two or three; "b" is more than 0.02; and "c" is from 0.8 to 1.2 when "a" is two; or "c" is from 1.8 to 2.6 when "a" is three; and the particulate material has thicknesses whose average value is from 3.5 nm or more to 20 nm or less, and sizes, [{(longer sides)+(shorter sides)}/2], whose average value is from 50 nm or more to 300 nm or less.

(IX) The present production process according to above-described (VIII) preferably further comprises:

a pretreatment step of removing some of contained aluminum (Al) elements by reacting an acidic substance, which is composed of a combination of a fluoride salt and hydrochloric acid and is put in a controlled state of from 20° C. to 30° C., with an "MAX"-phase ceramic powder with a composition expressed by $M_aAl_dX_c$ in which "M" includes one or more elements selected from the group consisting of Ti, V, Cr, Sc, Zr, Nb, Mo, Hf and Ta and "X" includes C or one or more chemical structures selected from the group consisting of $C_{(1.0-x)}N_x$ (where "x" is 0<"x"≤1.0), wherein: "a" is two or three; "d" is one; and "c" is one when "a" is two; or "c" is two when "a" is three, thereby producing the raw material.

The present particulate material allows a flaky particulate material in which surface oxidation is less likely to occur and exhibits low electric resistance to be produced in a large amount, because it forms a crystal structure in which Al remains upon temperature increment caused by an exothermic reaction at an acidic treatment step. Moreover, forming a flaky particulate material with the above-described size and thickness makes the produced flaky particulate material comprising gap layers, which are formed by removing the Al layers and provide a large interlayer distance, effective for an ingredient for negative-electrode active material for secondary battery, and for a material for a transparent electrode.

Moreover, the present production process carries out bead milling in which the size of beads is selected so as to provide a produced particulate material with a thickness and size that fall in a predetermined range respectively. Consequently, the present production process allows the produced particulate material to be flakily exfoliated effectively while keeping the characteristic of exhibiting low electric resistance. Meanwhile, the exfoliation by ultrasonic irradiation, which has been carried out conventionally, has been making it essential to classify and then take out exfoliated particles by centrifugal separation, because it exfoliates only some of a produced particulate material. In contrast, the present technique permits a flaked particulate material to be further exfoliated in a large amount, and enables one to produce an "MXene" particulate material including many particles that are turned into nanometer-size sheets.

DESCRIPTION OF THE EMBODIMENTS

Figure 1:
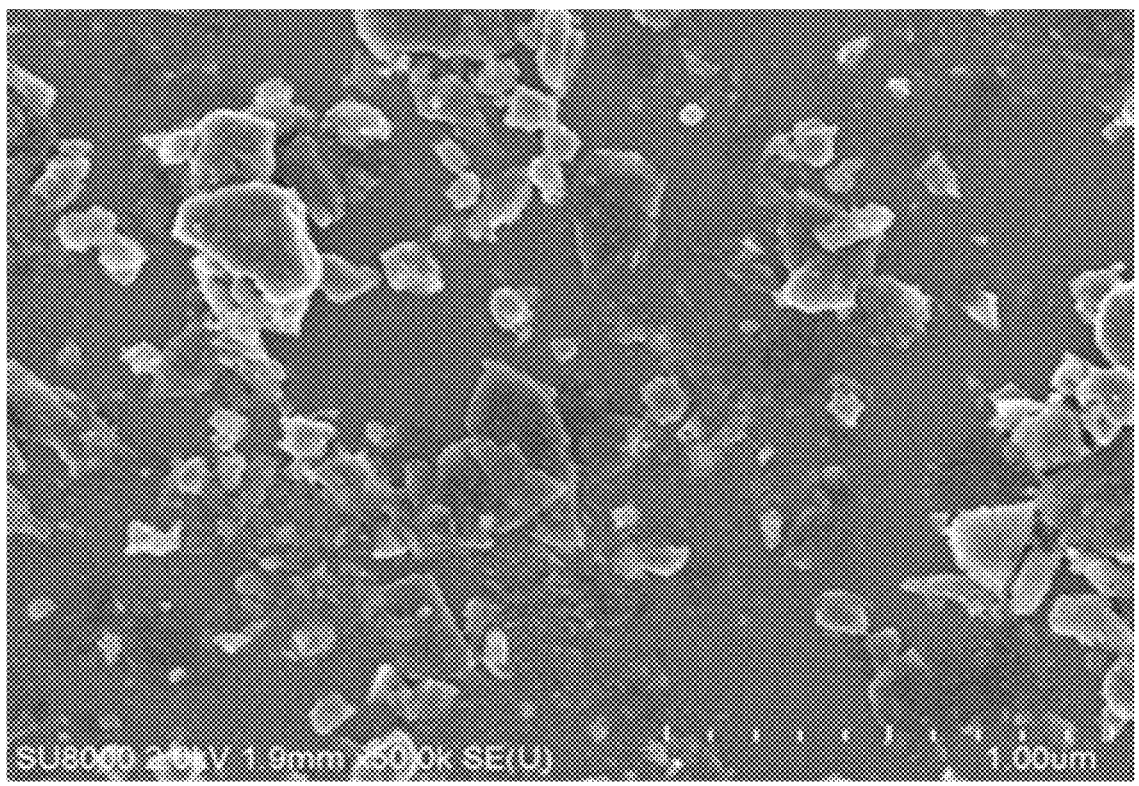
FIG. 1 is an SEM photograph of a particulate material according to First Example.

A particulate material according to the present invention, and a production process for the same, as well as a slurry, secondary battery and transparent electrode according to the present invention will be hereinafter described in detail based on an embodiment. A particulate material according to the present embodiment is applicable to an ingredient for negative-electrode active material for secondary battery, such as lithium-ion secondary batteries, sodium-ion secondary batteries and capacitors, and a material for electrode for transparent electrode, because it is good in electric characteristics, for instance, it exhibits conductive property, and because it comprises gap layers formed by removing the Al layers and providing a large interlayer distance. The present particulate material is flakily turned into particles for the purpose of applying it to electrode materials, and the like. Exfoliating the present particulate material, a powdery intercalation compound, allows a flaky particulate material to be produced.

Particulate Material

A present particulate material according to the present embodiment comprises an intercalation compound with a predetermined compositional formula. The intercalation compound comprises gap layers which are formed by removing some of the Al layers by an acidic treatment and provide a large interlayer distance. The predetermined compositional formula involves $M_aAl_bX_c$. In the formula, "M" includes one or more elements selected from the group consisting of Ti, V, Cr, Sc, Zr, Nb, Mo, Hf, and Ta. A particularly preferable "M" includes Ti. "X" involves C, or one or more chemical structures selected from the group consisting of $C_{(1.0-x)}N_x$ (where "x" is $0<$"x"$\leq 1.0$). Moreover, the present particulate material can further comprise an O group, an OH group or a halogen group, which serves as a superficial functional group, in addition to the aforementioned elements. The present particulate material comprises broadened interlayers after the Al layers are removed, because the O group, OH group or halogen group adsorbs onto the superficial layer of the present particulate material, or onto the gap layers from which the Al layers are removed by an acidic treatment, specifically, layers in which Al elements exist.

Moreover, "a" is two or three. "b" is more than 0.02. An employable lower limit of "b" involves 0.03, or 0.04; and an employable upper limit of "b" involves 0.58, or 0.56. "c" is from 0.8 to 1.2 when "a" is two; or "c" is from 1.8 to 2.6 when "a" is three. An employable lower limit of "c" involves 0.8, or 0.9; and an employable upper limit of "c" involves 1.2, or 1.1; when "a" is two. Another employable lower limit of "c" involves 1.8, or 1.9; and another employable upper limit of "c" involves 2.6, 2.4, or 2.2; when "a" is three. It is possible to employ each of the lower limits and upper limits presented for the values "b" and "c" while combining them at one's discretion.

When "M" includes Ti, following (1) through (4) disclose especially preferable combinations of "X," "a," "b," and "c."

(1) "X" includes C, "a"=2, $0.65\geq$"b"$\geq 0.03$, and $1.2\geq$"c"$\geq 0.8$;

(2) "X" includes $C_{(1.0-x)}N_x$ (where "x" is $0<$"x"$\leq 1.0$), "a"=2, $0.65\geq$"b"$\geq 0.03$, and $1.2\geq$"c"$\geq 0.8$;

(3) "X" includes C, "a"=3, $0.65\geq$"b"$\geq 0.03$, and $2.6\geq$"c"$\geq 1.8$; and (4) "X" includes $C_{(1.0-x)}N_x$ (where "x" is $0<$"x"$\leq 1.0$), "a"=3, $0.65\geq$"b"$\geq 0.03$, and $2.6\geq$"c"$\geq 1.8$.

The present particulate material has such a configuration as plate shapes, leaf shapes or flaky shapes. When dimensions in the lamination direction of the layers in an intercalation compound are labeled "thicknesses" and the maximum and minimum values of dimensions in a direction perpendicular to the "thicknesses" are labeled "longer sides" and "shorter sides" respectively, the present particulate material has an average value of from 50 nm or more to 300 nm or less in sizes (i.e., [{("longer sides")+"shorter sides")}/2]), and another average value of from 3.5 nm or more to 20 nm or less in "thicknesses." An employable lower limit for the average value of "sizes" involves 50 nm, 70 nm, or 100 nm; and an employable upper limit therefor involves 300 nm, or 250 nm. An employable lower limit for the average value of "thicknesses" involves 3.5 nm, 4.0 nm, or 4.2 nm; and an employable upper limit therefor involves 20 nm, or 15 nm. It is possible to employ each of the lower limits and upper limits presented for the averages values of "sizes" and "thicknesses" while combining them at one's discretion.

The present particulate material turned into a powder compact preferably exhibits a surface resistance of from $0.1\Omega/\square$ or more to $300\Omega/\square$ or less. Allowing a certain extent of resistance value (e.g., $0.1\Omega/\square$ or more) permits a final product to be readily produced without setting any production condition so as to employ an atmosphere where oxidation is less likely to develop, because a particulate material is partially oxidized in the surface in undergoing temperature increment caused by an exothermic reaction upon subjected to an acidic treatment. Meanwhile, letting the power compact exhibit a surface resistance of $300\Omega/\square$ or less enables the present particulate material to be provided with required performance when applied to an ingredient for negative-electrode active material for secondary battery, and to a material for transparent electrode. A possible lower-limit value for the surface resistance involves 0.1 $\Omega/\square$, 1.0 $\Omega/\square$, or $3.0\Omega/\square$; and a possible upper-limit value therefor involves 300 $\Omega/\square$, $280\Omega/\square$, or 260 $\Omega/\square$.

It is possible to set a fabrication condition, under which the present particulate material is turned into the powder compact body measuring surface resistance, so as to comprise the steps of: making a pellet of the present particulate material at 0.5 kg/cm² with a ϕ12-mm mold; processing the pellet into a pelletized powder compact at three ton/cm² by cold isotactic pressing (or CIP); and measuring the pelletized powder compact for surface resistance by a four-terminal method using a 0.1-mm copper wire.

The present particulate material allows the true density to exhibit a lower limit of 3.36 g/cm³, 3.40 g/cm³, or 3.42 g/cm³; and an upper limit of 4.10 g/cm³, 4.20 g/cm³, or 4.45 g/cm³. In particular, when "M" includes Ti, a preferable lower limit and upper limit of the true density depends on how "X" is selected. For each of the combinations of Ti and "X," a preferable value of the true density involves those as described in following (1) and (2).

(1) "X" includes C, and the particulate material has a true density of from 3.36 g/cm³ to 3.50 g/cm³ when "a" is two, or has a true density of from 3.70 g/cm³ to 4.45 g/cm³ when "a" is three; and (2) "X" includes $C_{(1.0-x)}N_x$ (where "x" is $0<$"x"$\leq 1.0$), and the particulate material has a true density of from 3.36 g/cm³ to 3.50 g/cm³ when "a" is two, or has a true density of from 3.70 g/cm³ to 4.45 g/cm³ when "a" is three.

Production Process for Particulate Material

A production process for particulate material according to the present embodiment is a method suitable for producing the above-described present particulate material. The present production process comprises an exfoliation step of turning a powdery particulate material into a flaky particulate material by bead milling using beads of from 10 μm to 300 μm in size.

An employable raw material to be supplied to the exfoliation step involves a particulate material comprising an intercalation compound with an $M_aAl_bX_c$ compositional formula, the same compositions as those of the present particulate materials to be produced eventually. Therefore, detailed descriptions on the types of "M" and "X," the values of "a," "b" and "c," and the true density of an intercalation compound for the raw-material particulate material will be omitted hereinafter, because those descriptions for the above-described present particulate material are applicable to those for the raw-material particulate material as they are.

(i) Pretreatment Step

A raw material to be supplied to a pretreatment step can be produced by bringing an acidic substance into contact with an "MAX"-phase ceramic powder at a temperature of from 20° C. to 30° C., thereby removing some of Al elements included in the "MAX"-phase ceramic powder. For example, the raw material to be supplied to the pretreatment step comprises an "MAX" ceramic powder with a composition expressed by $M_{n+1}AX_n$ (where "n"=1 or 2, "M" is a transition metal, "A" is Al, and "X" is C or $C_{(1-x)}N_x$ (where 0<"x"≤1)). Moreover, an amount of Al to be removed is adjusted to the extent that an amount of Al (equivalent to the value "b"), which remains in the "MAX"-phase ceramic powder produced by an acidic treatment with an acidic substance, is more than 0.02. Note that it is also possible to remove Al entirely. If such is the case, however, it is preferable not to develop the acidic treatment more than removing Al completely.

An amount of Al to be removed may be adjusted by changing the following: a time for which Al comes in contact with an acidic substance (e.g., an acidic aqueous solution, or the like) wherein the longer the time is the more the removed amount increases; a concentration of the acidic substance wherein the higher the concentration is the more the removed amount increases; an amount of the acidic substance wherein the greater an absolute amount of the acidic substance is the greater the removed amount can be made; and a temperature at which Al is brought into contact with the acidic substance wherein the higher the temperature is the more the removed amount increases.

Subjecting an "MAX"-phase ceramic powder whose "A" element is Al, one of intercalation compounds, to an acidic treatment removes some of its Al, turns it into an intercalation compound with gap layers that constitutes the present particulate materials. A to-be-employed acid for removing some of Al layers in the ceramic powder involves an acidic substance in which hydrofluoric acid is combined with hydrochloric acid. In order to materialize a combination of hydrofluoric acid with hydrochloric acid, it is preferable to produce a mixture of hydrofluoric acid and hydrochloric acid by mixing a salt of hydrofluoric acid, such as KF or LiF, with hydrochloric acid.

In particular, a to-be-employed acidic substance involves aqueous solutions of the hydrofluoric acid and hydrochloric acid. A mixed concentration of the hydrofluoric acid and hydrochloric acid, which is formed when a fluoride salt is assumed to dissociate completely, is not at all restricted especially. A possible lower limit of a concentration of the hydrofluoric acid involves 1.7 mol/L, 2.0 mol/L, or 2.3 mol/L approximately; and a possible upper limit of the concentration involves 2.5 mol/L, 2.6 mol/L, or 2.7 mol/L approximately. A possible lower limit of a concentration of the hydrochloric acid involves 2.0 mol/L, 3.0 mol/L, or 4.0 mol/L approximately; and a possible upper limit of the concentration involves 13.0 mol/L, 14.0 mol/L, or 15.0 mol/L approximately.

A mixed ratio (or molar ratio) between the hydrofluoric acid and hydrochloric acid, which are formed when a fluoride salt is assumed to dissociate completely, is not at all restricted especially, either. However, an employable lower limit of the hydrofluoric acid involves 1:13, 1:12, or 1:11 by mole approximately; and an employable upper limit thereof involves 1:5, 1:6, or 1:7 by mole approximately. It is possible to employ each of the lower limits and upper limits presented herein while combining them at one's discretion. A preferable temperature of the acidic treatment is from 20° C. to 30° C., and a more preferable temperature thereof is from 20° C. to 25° C.

(ii) Exfoliation Step

So as to give the forms, which are described for the above-described present particulate material, to the particulate material that is produced to include many flaky particles after the exfoliation step, one of the following factors is adjusted as an example for the exfoliation step: a diameter of beads; a peripheral velocity; a feeding rate of slurry; a filled amount of beads; and a particulate concentration in slurry. The exfoliation step is a step of exfoliating layers in an intercalation compound, one of the raw materials. Using micro-size beads with 10 µm to 300 µm in diameter makes it possible to exfoliate flakes from the gap layers from which some of the Al layers are removed by the acidic treatment. Collision of the micro-size beads with interlayers in the intercalation compound allows exfoliating flakes in nanometer-level thicknesses.

An employable raw material to be supplied to the exfoliation step involves those with the same compositions as those of the materials that constitute the above-described present particulate material. Generally, the exfoliation step does not change the composition largely.

The exfoliation is made possible by a bead mill equipped with a mechanism of classifying micro-fine beads from a slurry by centrifugal separation. For example, a possible lower limit of the sizes of beads is 10 µm, 15 µm, 20 µm, 30 µm, or 40 µm; and a possible upper limit thereof is 300 µm, 200 µm, or 100 µm. Using beads with 10 µm or more in size makes the classification of the beads from a slurry easy. Using beads with 300 µm or less permits the exfoliation to develop more preferentially than making the present particulate material smaller in size. It is possible to employ each of the lower limits and upper limits while combining them at one's discretion. Moreover, it is most preferable to employ beads with from 50 µm to 100 µm in size, because beads with sizes falling in a proper range allow an energy to be given to the present particulate material to enlarge and permit the exfoliation to develop preferentially.

Although the beads are not at all restricted in material quality, it is possible to employ ceramics, such as zirconia, alumina and silicon nitride, for the beads. In particular, partially-stabilized zirconia is a preferable option because of the large fracture toughness. Meanwhile, note that making sizes of the present particulate material smaller is developed more preferentially than the exfoliation by a commonly-used bead mill in which beads with more than 300 µm in size are used to classify the beads from a slurry in micro-size clearances or interspaces. Moreover, making sizes of the present particulate material smaller is also developed more preferentially than the exfoliation by a ball mill, such as a planetary ball mill, in which beads or balls with more than 300 µm in size are used.

An employable peripheral velocity at the exfoliation step is from six m/sec to 12 m/sec. A preferable peripheral velocity is from eight m/sec to 10 m/sec. A peripheral velocity of six m/sec or more offers a good exfoliation efficiency, whereas a peripheral velocity of 12 m/sec or less inhibits the development of oxidation in the surface of the resulting present particulate material and allows making electric resistance low, because it inhibits the impartation of excessive energy, and because it permits inhibiting the temperature of the resultant present particulate material from increasing. An employable feed rate of slurry is from 100 mL/min to 300 mL/min. An employable particulate concentration in slurry is from one mg/mL to five mg/mL. The exfoliation step is preferably carried out under the condition that a particulate concentration in slurry is five mg/mL or less, because the particulate concentration allows the exfoliation to develop fully and lowers the necessity of classification by centrifugal separation, or the like, for the selection of flaky particulate material. Moreover, the particulate concentration in slurry being five mg/L or less enables the resulting slurry to keep diameters of submerged particles low. In addition, setting a particulate concentration in slurry to one mg/mL or more makes the efficiency of exfoliation better.

A preferable temperature of slurry falls in a range of 35° C. or less. Setting the temperature to 35° C. or less allows inhibiting the present particulate material from being oxidized in the surface, and permits it to keep the electric resistance low.

An employable amount of filled beads is from 40% to 80% by volume. Setting the filling amount to 40% by volume or more makes the efficiency of exfoliation better; whereas setting it to 80% by volume or less makes the classification of beads from a slurry easier. An exemplifiable filling amount of beads involves 45% by volume, 50% by volume, 55% by volume, 60% by volume, 65% by volume, 70% by volume, or 75% by volume. An observation with a scanning electron microscope (or SEM) or transmission electron microscope (or TEM) allows judging whether or not a particulate material including many targeted flaky particulates is produced. In particular, doing an analysis with an atomic force microscope (or AFM) permits judging the present particulate material for thickness. It is also possible to utilize a particulate material obtained by the exfoliation step after subjecting it to such a classification method as centrifugal separation, if needed. Optimum conditions at the exfoliation step are not all restricted to the above-described numerical values, because they vary depending on the size of apparatuses.

According to the results of X-ray diffraction (or XRD) analysis of $Ti_3AlC_2$, for instance, an "MAX"-phase ceramic (or $Ti_3AlC_2$) powder had an interplanar spacing of 0.93 nm between the (002) planes; whereas the post-exfoliation flaky "MXene" particulate material according to the present embodiment had a broadened interplanar spacing of 1.360 nm between the (002) planes. Specifically, a gap with about 0.43 nm in distance exists. Subtracting an interplanar spacing between the (002) planes in an "MAX"-phase ceramic powder from an interplanar spacing between the (002) planes in a post-exfoliation particulate material allows the computation of an interlayer distance between the gap layers. The gap layers are good in affinity with lithium ions and sodium ions, because they have adhered functional groups, such as an OH group and halogen groups, in the surface. The present particulate material, which is used in a negative-electrode active material for secondary battery, stores lithium or sodium ions in the gap faces. Consequently, the present particulate material is effective as a negative-electrode active material for secondary battery.

Note that using a conventional exfoliation technique, like ultrasonic irradiation, or wet-type jet mill or roller mill, has made it difficult to fully exfoliate the present particulate material.

Secondary Battery

A secondary battery according to the present embodiment comprises the above-described present particulate material as one of active materials of electrode materials. The present secondary battery is effective for lithium secondary batteries, and sodium secondary batteries. The lithium ions and sodium ions are readily stored in and eliminated from the gap layers in the present particulate material from which the Al layers are removed by the acidic treatment.

The present secondary battery is herein described while exemplifying a lithium secondary battery. One of the electrodes of the present secondary battery comprises an active material layer, and an electricity collector. The active material layer includes an active material composed of the present particulate material. The electricity collector is made up of metallic thin plates, and is provided with the active material layer composed of the active material on the surfaces. The electrode may further comprise a binder for forming the active material layer. Moreover, the active material layer may further contain the other active material in addition to the present particulate material, or an electrically-conductive auxiliary agent, if needed. An employable binder involves general-purpose binders like carboxymethyl cellulose, polyvinylidene fuloride, styrene-butadiene rubber, polyvinyl pyrrolidone and polyvinyl alcohol; or the other elastomers available as a binder. An employable electrically-conductive auxiliary agent involves acetylene black, KETJENBLACK, carbon nano-tubes, graphene, carbon fibers, graphite powders, and hard carbon powders.

Transparent Electrode

A transparent electrode according to the present embodiment comprises the present particulate material, a binder, and other necessary members. An employable binder involves those described for the above-described present secondary battery. In particular, the binder preferably includes one of those materials with high transparency.

EXAMPLES

First Example

The respective powders of three-µm TiC produced by RARE METALLIC, 35-µm Ti produced by KOJUNDO CHEMICAL LABORATORY, and 30-µm Al produced by KOJUNDO CHEMICAL LABORATORY were mixed into a mixed powder whose TiC:Ti:Al ratio equaled 2:1:1 by mole. The resulting mixed powder was subjected to a solid-phase reaction at 1,450° C. in an argon gas flow with a small-size vacuum-pressurizing sintering furnace, thereby making "MAX"-phase ceramics.

The resulting "MAX"-phase ceramics were pounded or grounded in an alumina mortar, were thereafter pulverized in isopropyl alcohol (or IPA) with a ball mill using zirconia balls with 5 mm in diameter for 24 hours, and were then further pulverized with a planetary ball mill using zirconia balls with 0.5 mm in diameter for 45 minutes. Measuring the resultant pulverized product for an average particle diameter in the IPA with a dynamic light-scattering particle-diameter-distribution measuring apparatus (e.g., "Zeta Sizer Nano ZSP produced by MALBURN) resulted in 1.0 µm.

Figure 10:
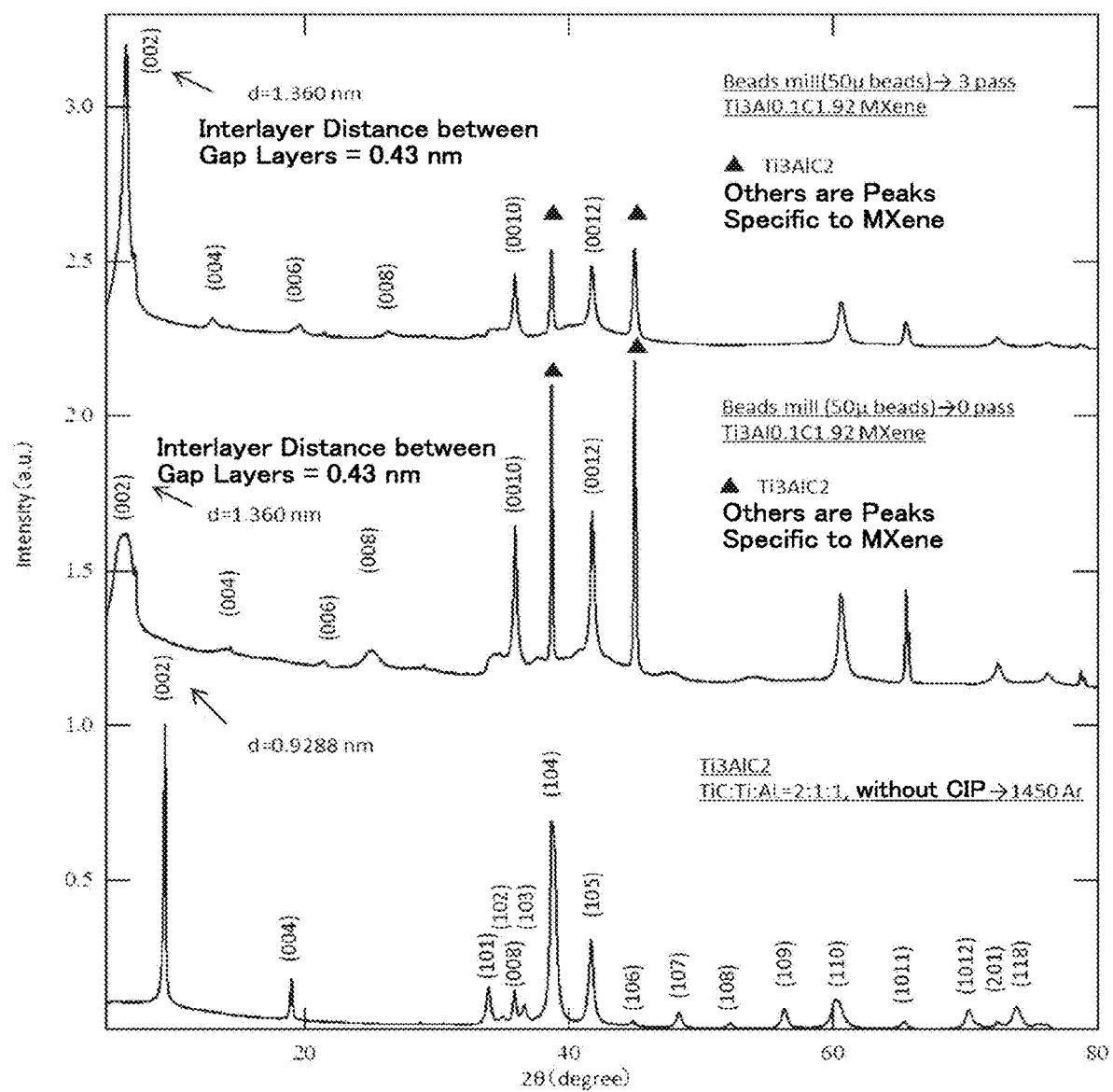
FIG. 10 is an XRD profile showing the results of measuring the particulate material according to First Example for X-ray diffraction intensity.

The resultant pulverized product was further subjected to a removal of the IPA using an evaporator under the conditions of 60° C. in a vacuum, and was thereafter subjected to an XRD analysis with a horizontally-held-sample type multipurpose X-ray diffractometer. The pulverized product was confirmed to have a single phase made of $Ti_3AlC_2$. FIG. 10 illustrates the analyzed results. The XRD test was carried out under the following conditions: the use of a holder made of silica glass; 40 kV/40 mA; eight-degree/min scanning speed; 0.01-degree sampling step; and from 5 to 80-degree 2θ.

A pretreatment step was carried out in the following manner: 10 grams of the thus produced $Ti_3AlC_2$ powder was charged slowly into a 300-mL mixed aqueous solution that contained 18.0-g LiF in 12M HCl and was cooled with ice in a polytetrafluoroethylene crucible; and the $Ti_3AlC_2$ powder was left in the mixed aqueous solution, whose temperature was controlled in a range of from 20° C. to 30° C., while stirring the mixed aqueous solution for 24 hours.

After water washing the dispersed $Ti_3AlC_2$ powder 10 times by centrifugal separation and removing a supernatant liquid repeatedly three times by centrifugal separation, ethanol was substituted for the solvent in the resulting dispersion liquid. The resultant ethanol slurry was dried at room temperature to carry out an XRD analysis. FIG. 10 illustrates the analyzed results. Moreover, the ethanol slurry was diluted to a particulate concentration of two mg/mL, and was then subjected to bead milling using beads having 50 μm in diameter. Note that the conditions of the bead milling were as follows: the use of beads made of "YTZ balls" produced by NIKKTO; three-round passing; 10 m/sec peripheral velocity; 150 mL/min liquid feeding rate; 60%-by-volume filled beads rate.

The ethanol slurry of the exfoliated flaky particulate material was measured for an average particle diameter in the ethanol with the dynamic light-scattering particle-diameter-distribution measuring apparatus, and Table 1 shows the obtained result. Moreover, 10 milliliters of the resulting ethanol slurry was dropped on an wafer made of silicon by a spin coater (e.g., "MS-B100" produced by MIKASA) operated at 600 rpm. The produced particulate material was measured for size (i.e., an average value of the "longer sides" and "shorter sides") by observation with an SEM, and was measured for thickness by analysis with an AFM. For each of the measurements, 100 isolated particles were selected to compute the average size and thickness. Table 1 shows the thus obtained results. FIG. 1 shows an SEM photograph showing the state of exfoliated particles. The SEM photograph was taken using a scanning electron microscope (e.g., "SU8020" produced by HITACHI SEISAKUSHO). The AFM used for measuring the thicknesses was "Nano Scope/Dimension Icon," an atomic force microscope produced by BULKER AX Corporation, which was operated in the tapping measurement mode for 512×512 measurement points.

The ethanol slurry of the produced particulate material was dried at room temperature. The resulting room-temperature dried powder was used to mea sure for surface electric resistance, Ti, C and Al contents by chemical analysis and true density, and was further analyzed by XRD.

In the chemical analysis, the atomic percentages of Ti, Al and C were used to compute the contents of Al and C when the content of Ti was taken as three. Table 1 shows the obtained results. The chemical analysis was carried out in the following manner: weighing out a sample in a predetermined amount in a platinum plate; adding a mixed solvent of nitric acid, sulfuric acid and hydrofluoric acid to the sample; dissolving the sample into the mixed solvent by heating the platinum plate at 120° C. approximately; and thereafter evaporating off the nitric acid and hydrofluoric acid by further heating it at a high temperature of 300° C. approximately, thereby making a sample solution of sulfuric acid; and subjecting the thus made sample solution to a quantitative analysis by inductively-coupled plasma (or ICP) after diluting it appropriately.

In measuring the produced particulate material for surface electric resistance, a molded body, whose relative density was from 60% to 65% and diameter and length were 12 mm×2 mm, was made of the particulate material by subjecting it to three-ton/$cm^2$ cold isostatic pressing (or CIP). Then, copper wires with 0.1 mm in diameter were fastened to the resultant molded body on the surface with a silver paste to mea sure it for electric resistance by a four-terminal method. The thus obtained electric resistance was taken as a surface resistance of the produced particulate material in units of Ω/□. Table 1 shows the obtained result. Moreover, the molded body was measured for true density by a constant-volume expansion method using helium gas (e.g., with "AccuPycII 1340" produced by SHIMADZU SEISAKUSHO), and Table 1 shows the measured result. In addition, the molded body was subjected to an XRD analysis, and FIG. 10 illustrates the analyzed results.

Second Example

The respective powders of three-μm TiC produced by RARE METALLIC, three-μm TiN produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:TiN:Ti:Al ratio equaled 1:1:1:1 by mole. The resulting mixed powder was subjected to one-ton/$cm^2$ CIP. Then, the resulting mixed powder was subjected to a solid-phase reaction at 1,550° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes.

Figure 11:
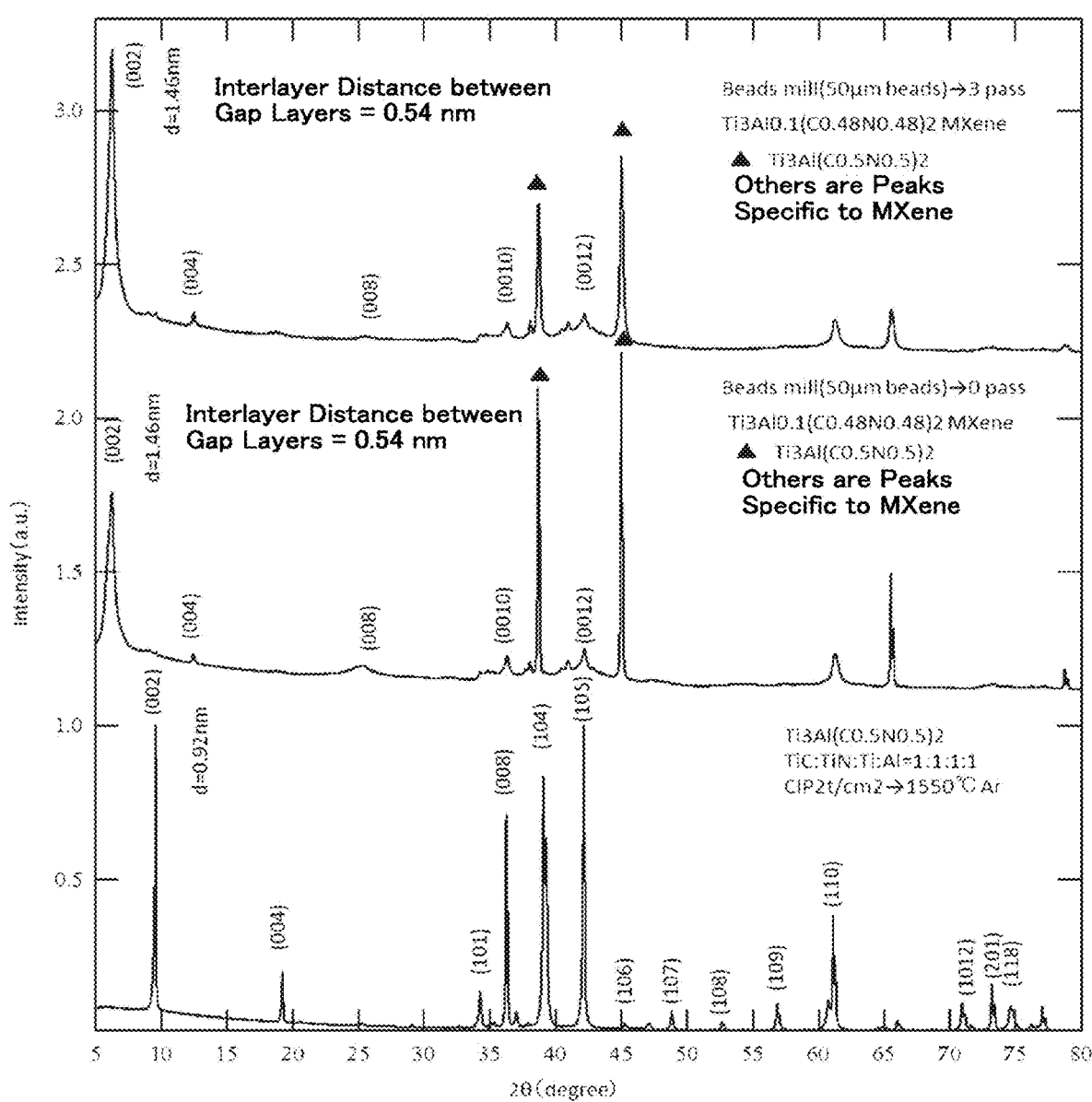
FIG. 11 is an XRD profile showing the results of measuring the particulate material according to Second Example for X-ray diffraction intensity.

Measuring the resultant pulverized product for an average particle diameter in the IPA with the dynamic light-scattering particle-diameter-distribution measuring apparatus resulted in 1.0 μm. Moreover, the pulverized product was further subjected to a removal of the IPA using an evaporator under the conditions of 60° C. in a vacuum, and was thereafter subjected to an XRD analysis. The pulverized product was confirmed to have a single phase made of $Ti_3Al(C_{0.5}N_{0.5})_2$. FIG. 11 illustrates the analyzed results. 10 grams of the thus produced $Ti_3Al(C_{0.5}N_{0.5})_2$ powder was subjected to the pretreatment step and bead milling carried out in the same manner as First Example.

Figure 2:
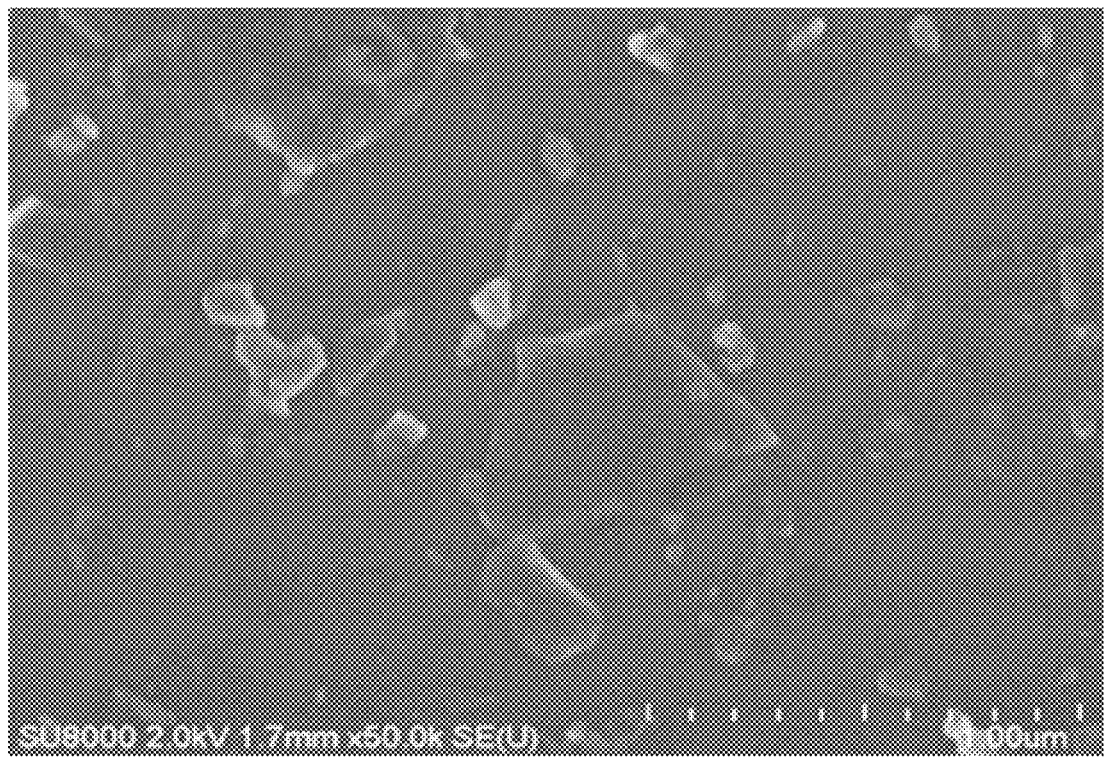
FIG. 2 is an SEM photograph of a particulate material according to Second Example.

The ethanol slurry of the exfoliated flaky particulate material was measured for an average particle diameter of the particulate material in the ethanol; and the particulate material was further measured for average size and thickness, surface electric resistance, Ti, Al, C and N contents by chemical analysis and true density, and was furthermore analyzed by XRD; in the same manner as First Example. Table 1 shows the results of the measurements, and FIG. 11 illustrates the results of the XRD analysis. FIG. 2 shows an SEM photograph showing the state of exfoliated particles in the particulate material.

Third Example

The respective powders of three-μm TiC produced by RARE METALLIC, three-μm TiN produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:TiN:Ti:Al ratio equaled 1.8:0.2:1:1 by mole. The resulting mixed powder was subjected to a solid-phase reaction at 1,450° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes. Measuring the resultant pulverized product for an average particle diameter in the IPA with the dynamic light-scattering particle-diameter-distribution measuring apparatus resulted in 1.0 μm. Moreover, the pulverized product was further subjected to a removal of the IPA using an evaporator under the conditions of 60° C. in a vacuum, and was thereafter subjected to an XRD analysis. The pulverized product was confirmed to have a single phase made of $Ti_3Al(C_{0.9}N_{0.1})_2$. 10 grams of the thus produced $Ti_3Al(C_{0.9}N_{0.1})_2$ powder was subjected to the pretreatment step and bead milling carried out in the same manner as First Example. The resulting particulate material was observed for the state of exfoliation with an SEM, and was found to be equal to that of First Example shown FIG. 1.

The ethanol slurry of the exfoliated flaky particulate material was measured for an average particle diameter of the particulate material in the ethanol; and the particulate material was further measured for average size and thickness, surface electric resistance, Ti, Al, C and N contents by chemical analysis and true density, and was furthermore analyzed by XRD; in the same manner as First Example. Table 1 shows the results of the measurements.

Fourth Example

Figure 12:
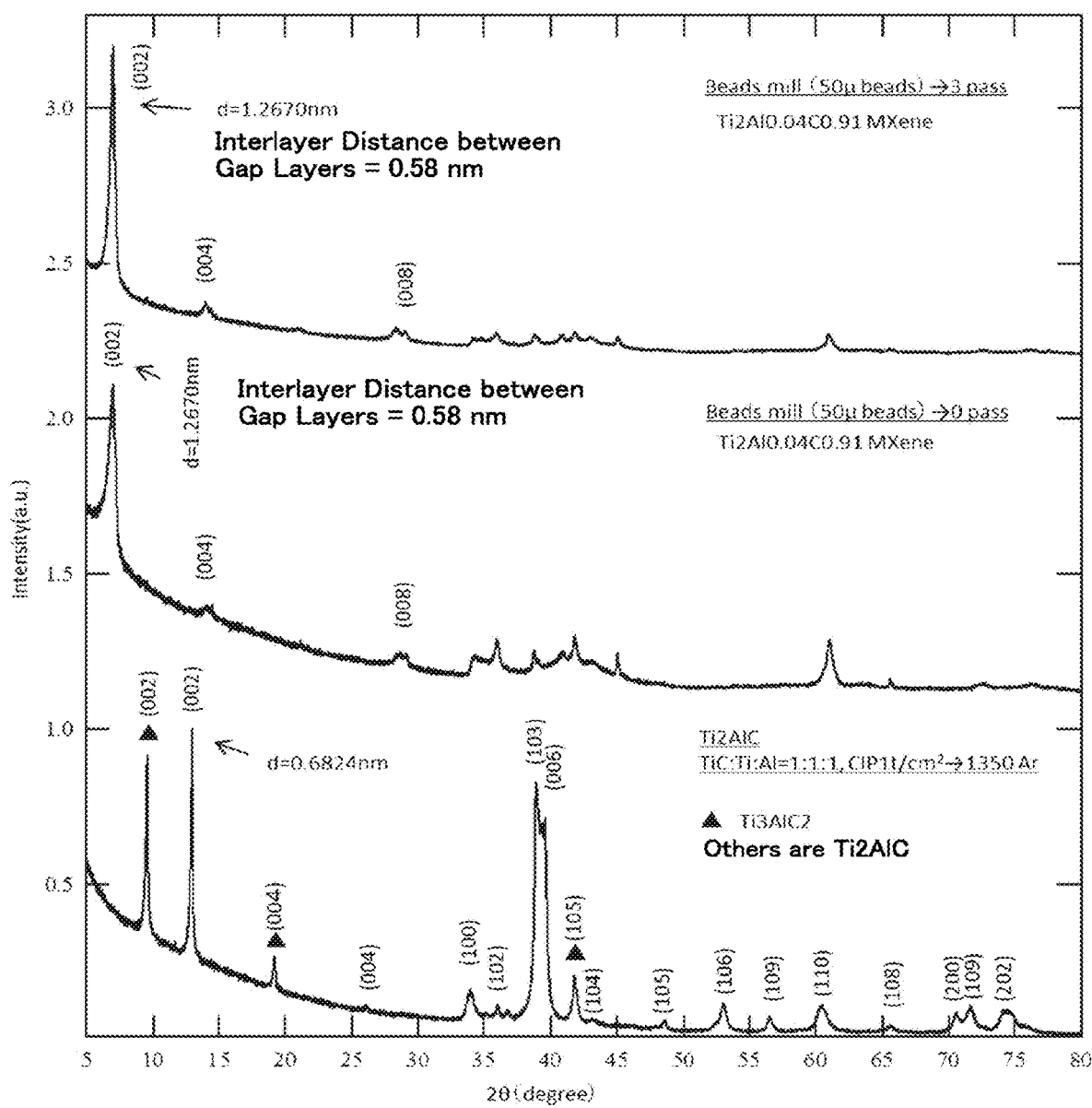
FIG. 12 is an XRD profile showing the results of measuring the particulate material according to Fourth Example for X-ray diffraction intensity.

The respective powders of three-μm TiC produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:Ti:Al ratio equaled 1:1:1 by mole. The resulting mixed powder was subjected to one-ton/cm$^2$ CIP. Then, the resultant powder-compact fractured fragments were subjected to a solid-phase reaction at 1,350° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes. Moreover, the pulverized fragments were further subjected to a removal of the IPA using an evaporator under the conditions of 60° C. in a vacuum, and were thereafter subjected to an XRD analysis. The pulverized fragments were confirmed to have a mixed phase made of $Ti_2AlC$ and $Ti_3AlC_2$. FIG. 12 shows the analyzed results. Five grams of the thus produced $Ti_2AlC$ powder was subjected to the pretreatment in which it was charged slowly into a 300-mL mixed aqueous solution that contained 4.5-g LiF in 6M HCl and was cooled with ice in a polytetrafluoroethylene crucible; and the $Ti_2AlC$ powder was left in the mixed aqueous solution whose temperature was controlled in a range of from 20° C. to 30° C. while stirring the mixed aqueous solution for 18 hours.

After water washing the dispersed $Ti_2AlC$ powder five times by centrifugal separation and removing a supernatant liquid repeatedly three times by centrifugal separation, ethanol was substituted for the solvent in the resulting dispersion liquid. The resultant ethanol slurry was dried at room temperature to carry out an XRD analysis. FIG. 12 illustrates the analyzed results.

Figure 3:
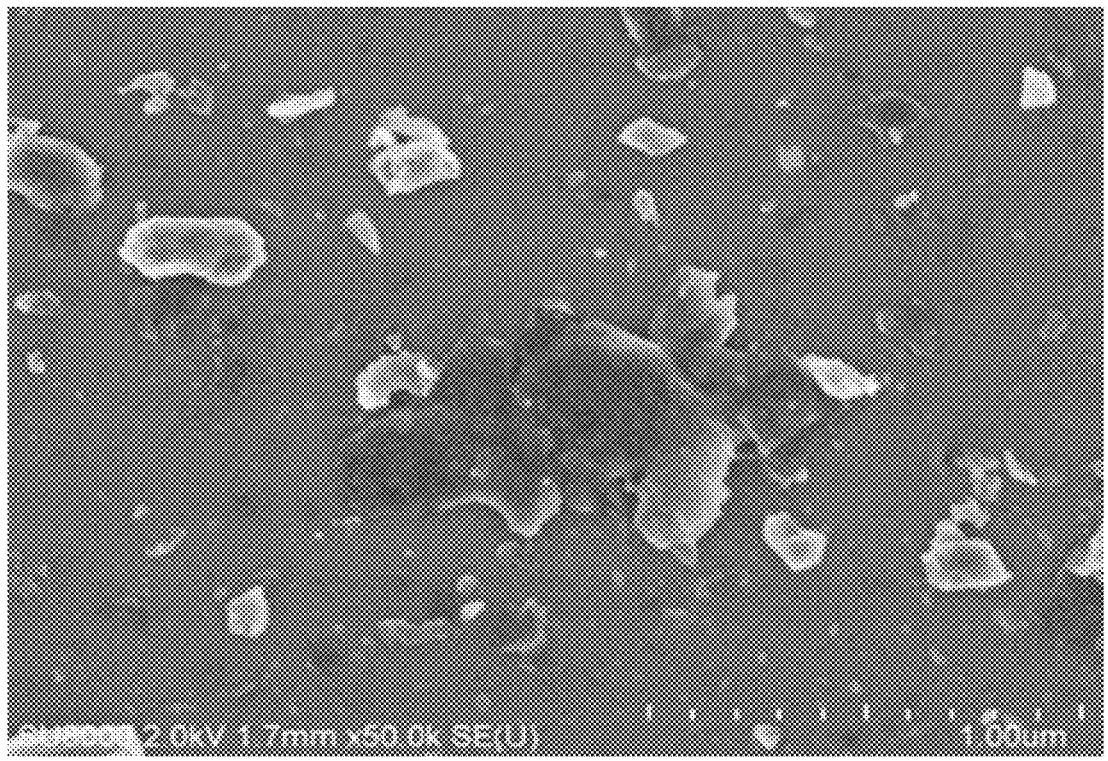
FIG. 3 is an SEM photograph of a particulate material according to Fourth Example.

The thus produced $Ti_2AlC$ powder was subjected to the bead milling carried out in the same manner as First Example. The resulting particulate material was observed for the state of exfoliation with an SEM. FIG. 3 shows the observed result.

The ethanol slurry of the exfoliated flaky particulate material was measured for an average particle diameter of the particulate material in the ethanol; and the particulate material was further measured for average size and thickness, surface electric resistance, Ti, Al and C contents by chemical analysis and true density, and was furthermore analyzed by XRD; in the same manner as First Example. Table 1 shows the results of the measurements, and FIG. 12 illustrates the results of the XRD analysis.

Fifth Example

Figure 13:
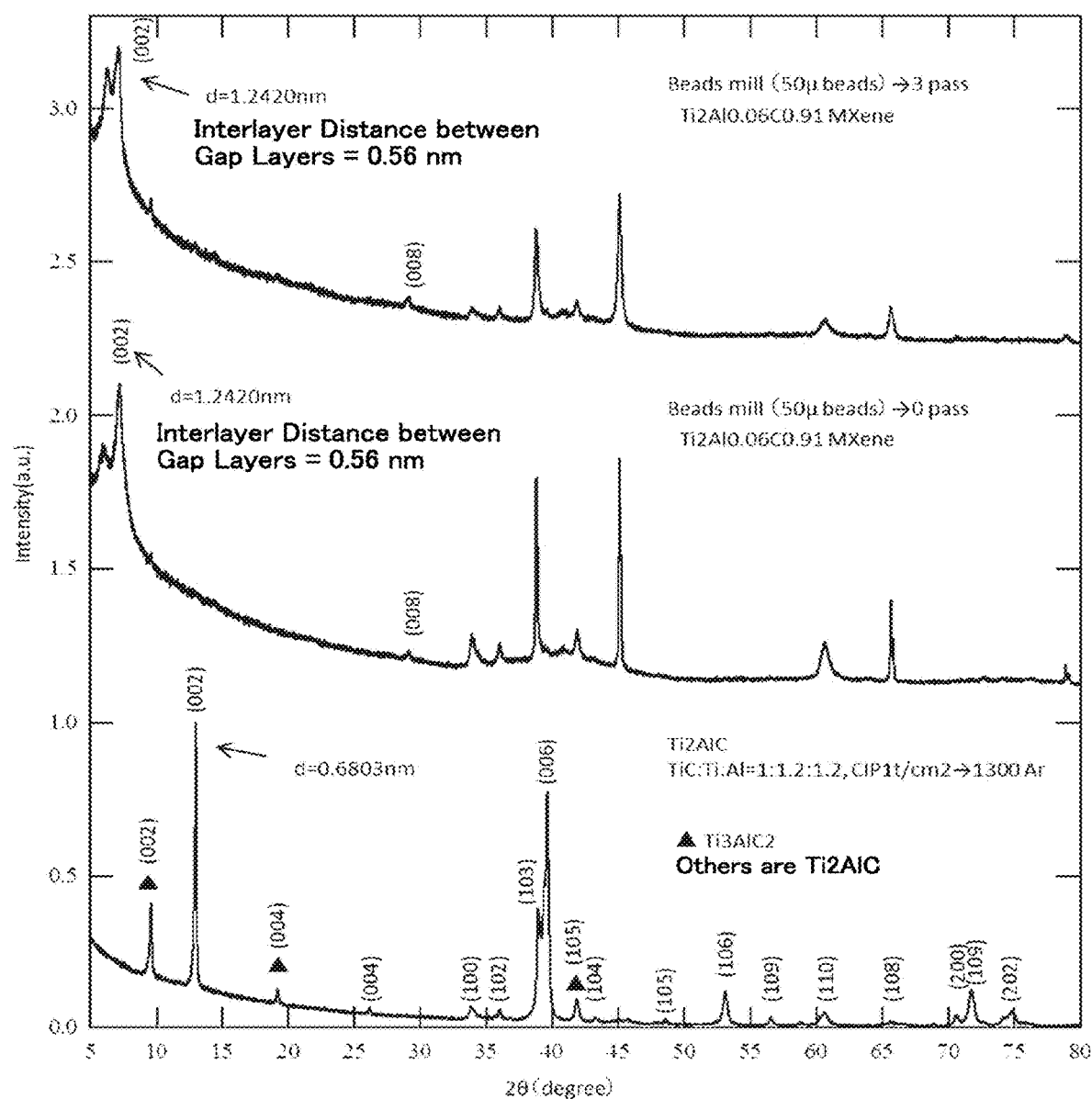
FIG. 13 is an XRD profile showing the results of measuring the particulate material according to Fifth Example for X-ray diffraction intensity.

The respective powders of three-μm TiC produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:Ti:Al ratio equaled 1:1.2:1 by mole. The resulting mixed powder was subjected to one-ton/cm$^2$ CIP. Then, the resultant powder compact was subjected to a solid-phase reaction at 1,300° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes. Measuring the resultant pulverized product for an average particle diameter in the IPA with the dynamic light-scattering particle-diameter-distribution measuring apparatus resulted in 1.0 μm. Moreover, the pulverized product was further subjected to a removal of the IPA using an evaporator under the conditions of 60° C. in a vacuum, and was thereafter subjected to an XRD analysis. The pulverized product was confirmed to have a mixed phase made of $Ti_2AlC$ and $Ti_3AlC_2$ which was however virtually composed of $Ti_2AlC$ phase. FIG. 13 shows the analyzed results. Five grams of the thus obtained $Ti_2AlC$ powder was subjected to the pretreatment in which it was charged slowly into a 300-mL mixed aqueous solution that contained 4.5-g LiF in 6M HCl and was cooled with ice in a polytetrafluoroethylene crucible; and the $Ti_2AlC$ powder was left in the mixed aqueous solution whose temperature was controlled in a range of from 20° C. to 30° C. while stirring the mixed aqueous solution for 18 hours.

After water washing the dispersed $Ti_2AlC$ powder 5 times by centrifugal separation and removing a supernatant liquid repeatedly three times by centrifugal separation, ethanol was substituted for the solvent in the resulting dispersion liquid. The resultant ethanol slurry was dried at room temperature to carry out an XRD analysis. FIG. 13 illustrates the analyzed results.

Figure 4:
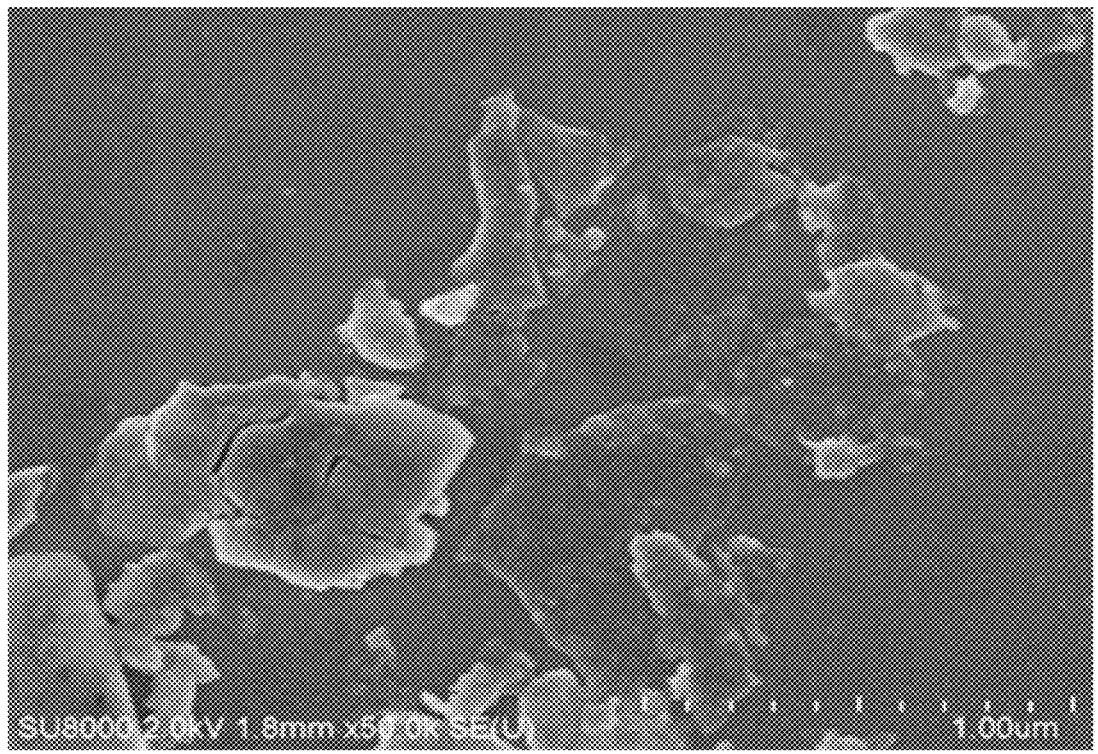
FIG. 4 is an SEM photograph of a particulate material according to Fifth Example.

The thus produced $Ti_2AlC$ powder was subjected to the bead milling carried out in the same manner as First Example. The resulting particulate material was observed for the state of exfoliation with an SEM. FIG. 4 shows the observed result.

The ethanol slurry of the exfoliated flaky particulate material was measured for an average particle diameter of the particulate material in the ethanol; and the particulate material was further measured for average size and thickness, surface electric resistance, Ti, Al and C contents by chemical analysis and true density, and was furthermore analyzed by XRD; in the same manner as First Example. Table 1 shows the results of the measurements, and FIG. 13 illustrates the results of the XRD analysis.

Sixth Example

The respective powders of three-μm TiC produced by RARE METALLIC, three-μm TiN produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:TiN:Ti:Al ratio equaled 0.5:0.5:1:1 by mole. The resulting mixed powder was subjected to one-ton/cm$^2$ CIP. Then, the resultant powder-compact fractured fragments were subjected to a solid-phase reaction at 1,350° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes.

Figure 14:
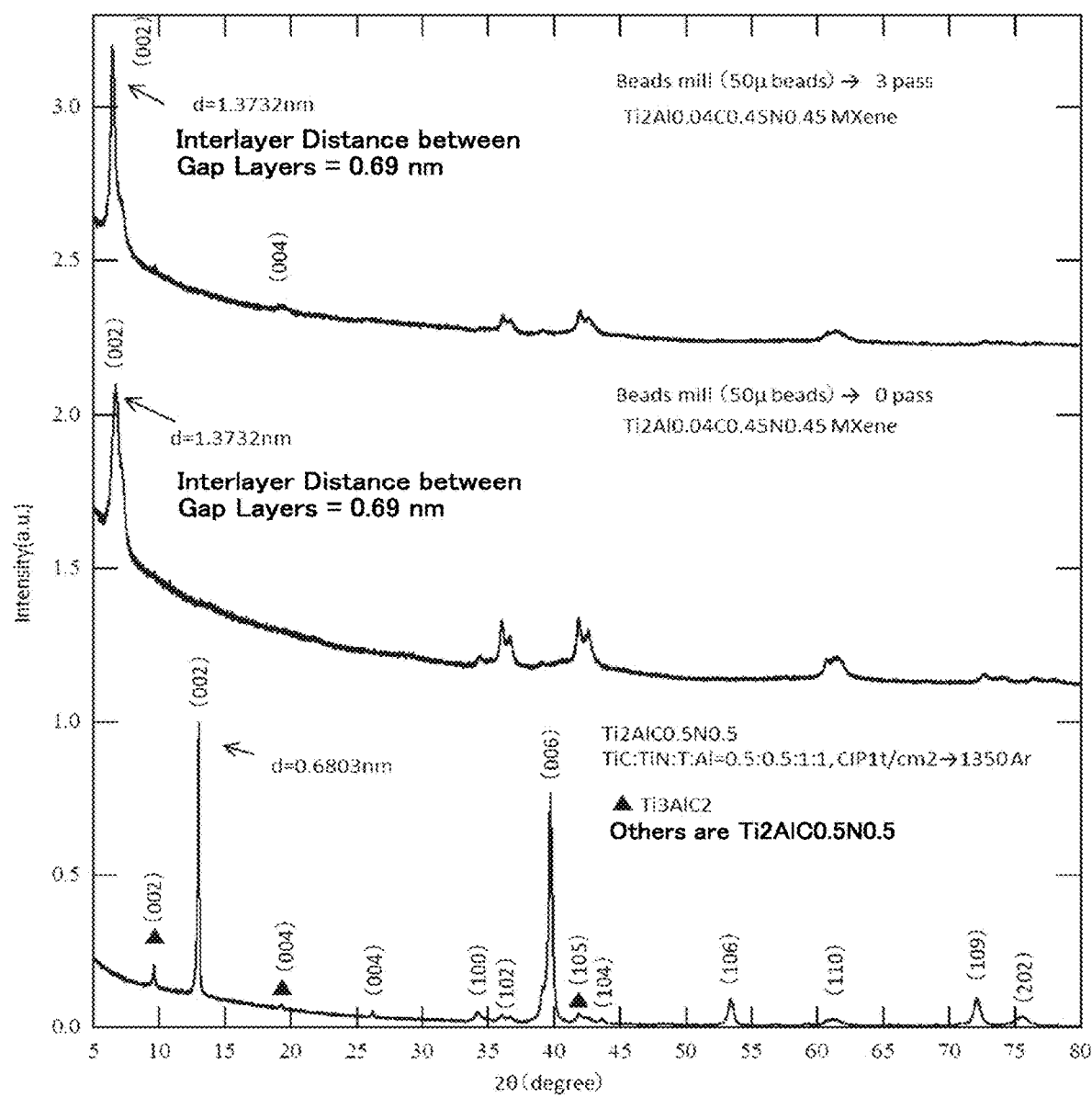
FIG. 14 is an XRD profile showing the results of measuring the particulate material according to Sixth Example for X-ray diffraction intensity.

Moreover, the resultant pulverized fragments were further subjected to a removal of the IPA using an evaporator under the conditions of 60° C. in a vacuum, and were thereafter subjected to an XRD analysis. The pulverized fragments were confirmed to have a single phase made of Ti$_2$Al(C$_{0.5}$N$_{0.5}$) virtually. FIG. 14 shows the result. Five grams of the thus obtained Ti$_2$Al(C$_{0.5}$N$_{0.5}$) powder was subjected to the pretreatment in which it was charged slowly into a 300-mL mixed aqueous solution that contained 4.5-g LiF in 6M HCl and was cooled with ice in a polytetrafluoroethylene crucible; and the Ti$_2$Al(C$_{0.5}$N$_{0.5}$) powder was left in the mixed aqueous solution whose temperature was controlled in a range of from 20° C. to 30° C. while stirring the mixed aqueous solution for 18 hours.

After water washing the dispersed Ti$_2$Al(C$_{0.5}$N$_{0.5}$) powder five times by centrifugal separation and removing a supernatant liquid repeatedly three times by centrifugal separation, ethanol was substituted for the solvent in the resulting dispersion liquid. The resultant ethanol slurry was dried at room temperature to carry out an XRD analysis. FIG. 14 illustrates the analyzed results.

Figure 5:
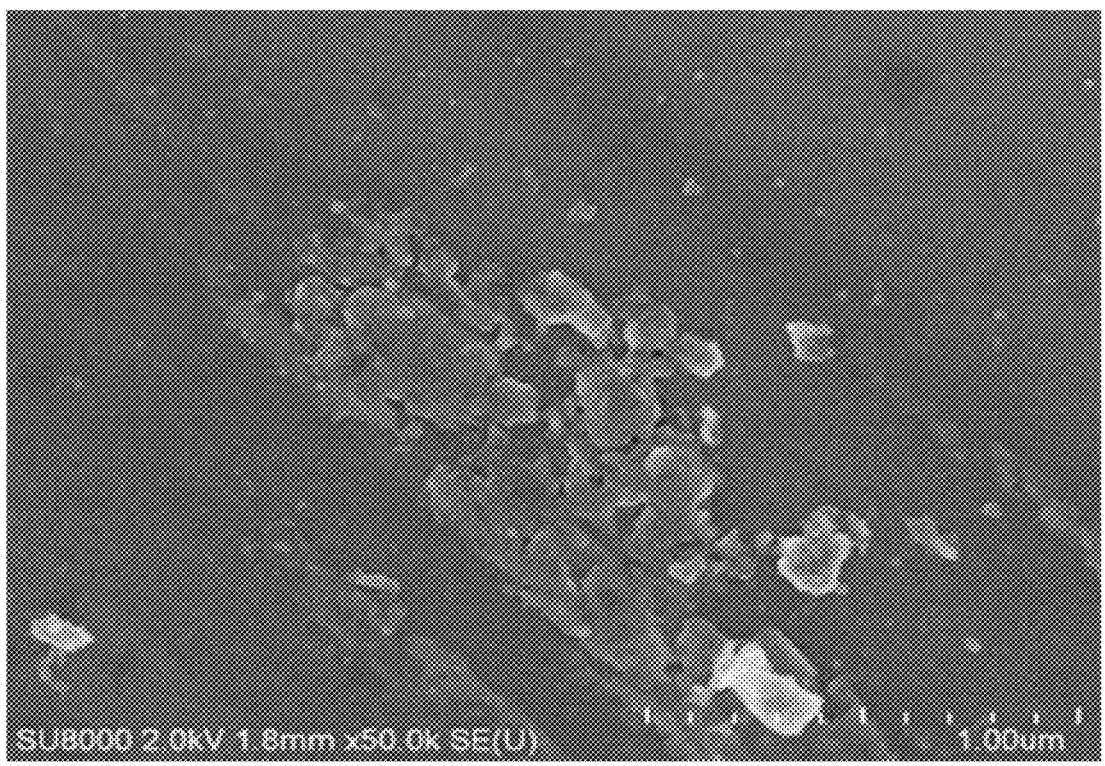
FIG. 5 is an SEM photograph of a particulate material according to Sixth Example.

The thus produced Ti$_2$Al(C$_{0.5}$N$_{0.5}$) powder was subjected to the bead milling carried out in the same manner as First Example. The resulting particulate material was observed for the state of exfoliation with an SEM. FIG. 5 shows the observed result.

The ethanol slurry of the exfoliated flaky particulate material was measured for an average particle diameter of the particulate material in the ethanol; and the particulate material was further measured for average size and thickness, surface electric resistance, Ti, Al, C and N contents by chemical analysis and true density, and was furthermore analyzed by XRD; in the same manner as First Example. Table 1 shows the results of the measurements, and FIG. 14 illustrates the results of the XRD analysis.

Seventh Example

The respective powders of three-μm TiC produced by RARE METALLIC, three-μm TiN produced by RARE METALLIC, 35-μm Ti produced by KOJUNDO CHEMICAL LABORATORY, and 30-μm Al produced by KOJUNDO CHEMICAL LABORATORY were mixed into a mixed powder whose TiC:TiN:Ti:Al ratio equaled 0.9:0.1:1:1 by mole. The resulting mixed powder was subjected to one-ton/cm$^2$ CIP. Then, the resultant powder-compact fractured fragments were subjected to a solid-phase reaction at 1,350° C. in an argon gas flow, thereby making "MAX"-phase ceramics. The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes.

Moreover, the resultant pulverized product was further subjected to a removal of the IPA using an evaporator under the conditions of 60° C. in a vacuum, and was thereafter subjected to an XRD analysis. The pulverized product was confirmed to have a mixed phase made of Ti$_2$Al(C$_{0.9}$N$_{0.1}$) and Ti$_3$Al(C$_{0.9}$N$_{0.1}$)$_2$. Five grams of the thus obtained Ti$_2$Al(C$_{0.9}$N$_{0.1}$) powder was subjected to the pretreatment step and bead milling carried out in the same manner as First Example. The resulting particulate material was observed for the state of exfoliation with an SEM, and was found to be equal to that of Fourth Example shown FIG. 1.

The ethanol slurry of the exfoliated flaky particulate material was measured for an average particle diameter of the particulate material in the ethanol; and the particulate material was further measured for average size and thickness, surface electric resistance, Ti, Al, C and N contents by chemical analysis and true density; in the same manner as Fourth Example. Table 1 shows the results of the measurements.

Eighth Example

The respective powders of three-μm TiC produced by RARE METALLIC, 35-μm Ti produced by KOJUNDO CHEMICAL LABORATORY, and 0.5-μm AlN produced by TOKUYAMA were mixed into a mixed powder whose TiC:Ti:AlN ratio equaled 1:2:1 by mole. The resulting mixed powder was subjected to one-ton/cm$^2$ CIP. Then, the resultant powder-compact fractured fragments were subjected to a solid-phase reaction at 1,550° C. in an argon gas flow, thereby making "MAX"-phase ceramics.

The resulting "MAX"-phase ceramics were pounded or grounded in an alumina mortar, were thereafter pulverized in IPA with a ball mill using zirconia balls with 5 mm in diameter for 24 hours, and were then further pulverized with a planetary ball mill using zirconia balls with 0.5 mm in diameter for 45 minutes.

Moreover, the resultant pulverized fragments were further subjected to a removal of the IPA using an evaporator under the conditions of 60° C. in a vacuum, and were thereafter subjected to an XRD analysis. The analyzed results found that the pulverized fragments had a single phase made of Ti$_2$Al(C$_{0.5}$N$_{0.5}$).

10 grams of the thus produced Ti$_3$Al(C$_{0.5}$N$_{0.5}$)$_2$ powder was subjected to the pretreatment in which it was charged slowly into a 100-mL mixed aqueous solution that contained 14.9-g KF in 6M HCl; and the Ti$_3$Al(C$_{0.5}$N$_{0.5}$)$_2$ powder was left in the mixed aqueous solution whose temperature was controlled in a range of from 20° C. to 30° C. while stirring the mixed aqueous solution for 30 hours. After water washing the dispersed Ti$_3$Al(C$_{0.5}$N$_{0.5}$)$_2$ powder 10 times by centrifugal separation and removing a supernatant liquid repeatedly three times by centrifugal separation, IPA was substituted for the solvent in the resulting dispersion liquid. Moreover, the resultant IPA slurry was diluted to a particulate concentration of two mg/mL, and were then subjected to bead mill using partially-stabilized zirconia balls with 50 μm in bead diameter. Note that the conditions of the bead milling were as follows: 20-round passing; 10 m/sec peripheral velocity; 150 mL/min liquid feeding rate; and 60%-by-volume filled beads rate. The thus produced particulate material was observed for the state of exfoliation with an SEM, and was found to be equal to that of Second Example shown FIG. 2.

The resultant exfoliated flaky particulate material was measured for average values of sizes and thicknesses, Ti, Al, C and N contents, true density, and value of surface electric resistance; and the IPA slurry of the particulate material was further measured for an average particle diameter of the particulate material in the IPA; in the same manner as Second Example. Table 1 shows the results of the measurements.

Ninth Example

Except for carrying out 20-round-passing bead milling using beads with 100 μm in bead diameter (e.g., "YTZ balls" produced by NIKKATO), a flaky particulate material was made in the same manner as Eighth Example. The thus produced exfoliated flaky particulate material was measured for average values of sizes and thicknesses, Ti, Al, C and N contents, true density, and value of surface electric resistance; and the IPA slurry of the particulate material was further measured for an average particle diameter of the particulate material in the IPA; in the same manner as First Example. Table 1 shows the results of the measurements. The produced particulate material was observed for the state of exfoliation with an SEM, and was found to be equal to that of Second Example shown FIG. 2.

Tenth Example

Except for carrying out 20-round-passing bead milling using beads with 30 μm in bead diameter (e.g., "Niimi NZ Bead 30" produced by NIIMI SANGYO), a flaky particulate material was made in the same manner as Eighth Example. The thus produced exfoliated flaky particulate material was measured for average values of sizes and thicknesses, Ti, Al, C and N contents, true density, and value of surface electric resistance; and the IPA slurry of the particulate material was further measured for an average particle diameter of the particulate material in the IPA; in the same manner as First Example. Table 1 shows the results of the measurements. The produced particulate material was observed for exfoliated state with an SEM, and was found to be equal to that of Second Example shown FIG. 2.

Eleventh Example

Except for using a mixed powder which was made of 35-μm Ti produced by KOJUNDO CHEMICAL LABORATORY, three-μm TiN produced by RARE METALLIC and 30-μm Al produced by KOJUNDO CHEMICAL LABORATORY, a flaky particulate material was made in the same manner as Eighth Example. The thus produced particulate material was measured for average values of sizes and thicknesses, Ti, Al and N contents, true density, and value of surface electric resistance; and the IPA slurry of the particulate material was further measured for an average particle diameter of the particulate material in the IPA; in the same manner as First Example. Table 1 shows the results of the measurements.

First Comparative Example

Figure 6:
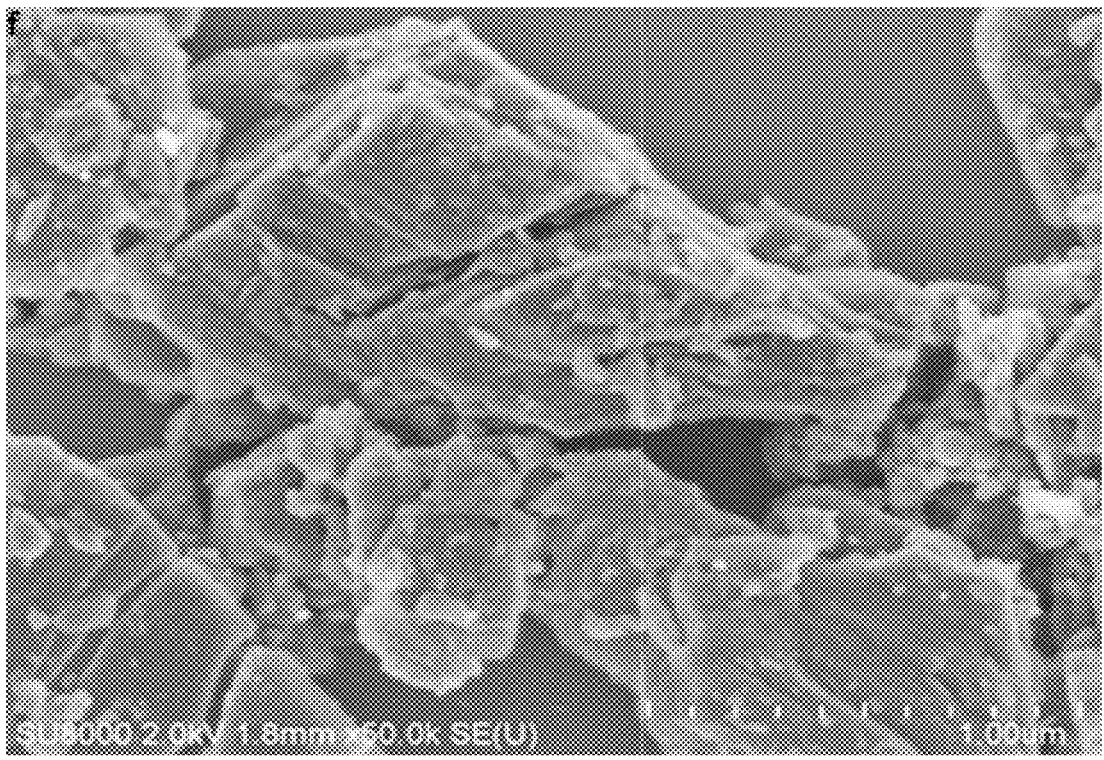
FIG. 6 is an SEM photograph of a particulate material according to First Comparative Example.

A $Ti_3AlC_2$ powder was made in the same manner as First Example. The $Ti_3AlC_2$ powder was subjected to the same acidic treatment and IPA substitution as those according to Eighth Example, thereby preparing an IPA slurry with two mg/cc in concentration. The IPA slurry was used to subject the $Ti_3AlC_2$ powder to exfoliation by ultrasonic irradiation with an ultrasonic homogenizer for 30 minutes, thereby making a flaky particulate material. Note that the conditions of the exfoliation were as follows: irradiating the $Ti_3Al\ C_2$ powder with an ultrasonic wave with 40 μm in amplitude, 19.5 kHz in frequency and 150 W in output for three seconds; and the ultrasonic irradiation was paused for one second. The thus produced particulate material was measured for average values of sizes and thicknesses, Ti, Al and C contents, value of surface electric resistance, and true density; and the IPA slurry of the particulate material was further measured for an average particle diameter of the particulate material in the IPA; in the same manner as First Example. Table 1 shows the results of the measurements. FIG. 6 shows an SEM photograph of the particulate material after trying to exfoliate it by the ultrasonic irradiation.

Second Comparative Example

Figure 7:
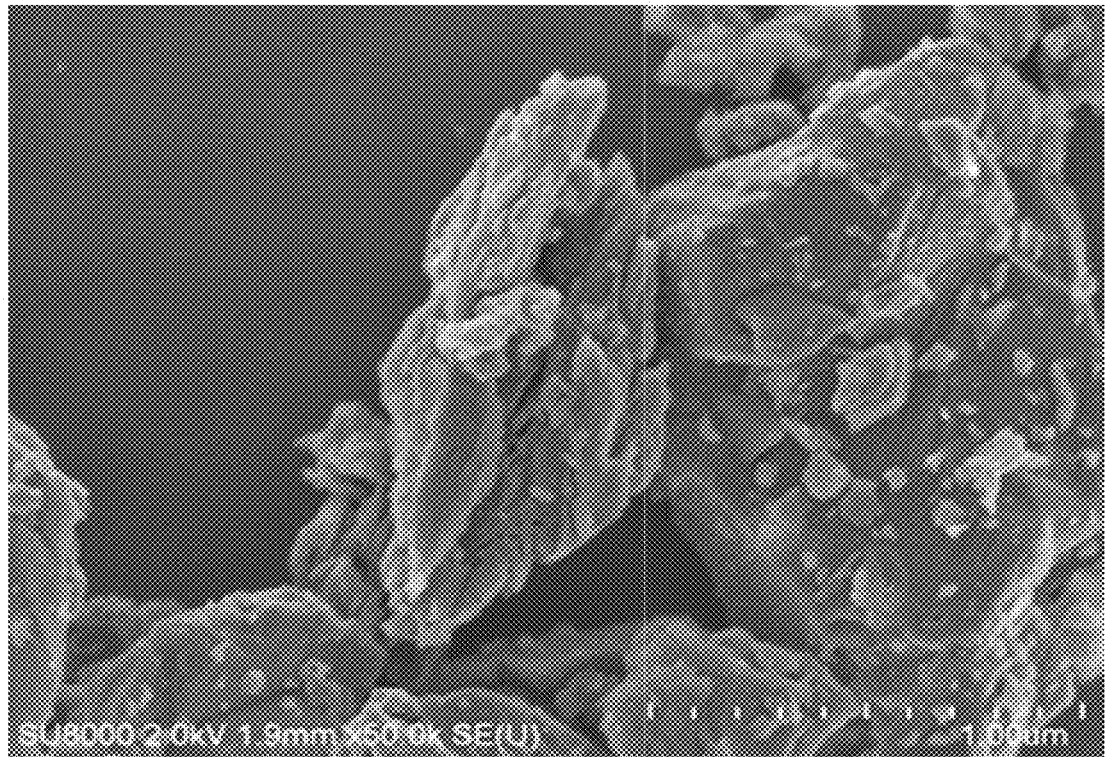
FIG. 7 is an SEM photograph of a particulate material according to Second Comparative Example.

Except for carrying out the exfoliation by the ultrasonic irradiation using the ultrasonic wave with 40 μm in amplitude, 19.5 kHz in frequency and 150 W in output for three hours, a particulate material was prepared in the same manner as First Comparative Example. The thus produced particulate material was measured for average values of sizes and thicknesses, Ti, Al and C contents, value of surface electric resistance, and true density; and the IPA slurry of the particulate material was further measured for an average particle diameter of the particulate material in the IPA; in the same manner as First Example. Table 1 shows the results of the measurements. FIG. 7 shows an SEM photograph of the particulate material after trying to exfoliate it by the ultrasonic irradiation.

Figure 15:
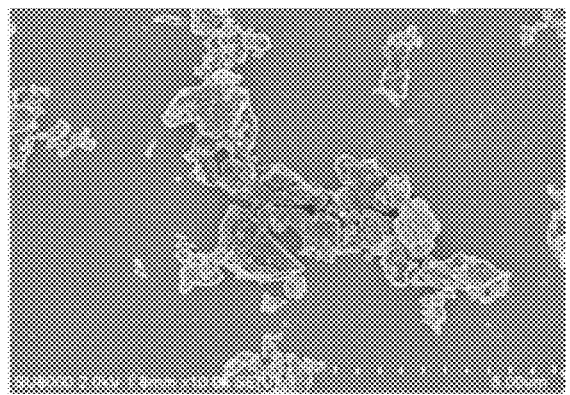
FIG. 15 is SEM photographs showing particulate materials exfoliated from the particulate material according to Second Comparative Example in the middle of classification in progress.
Figure 15:
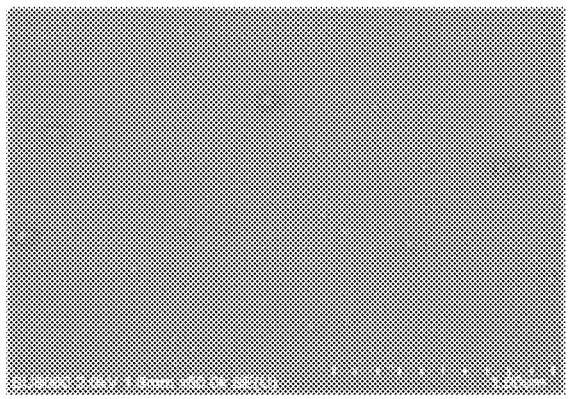
Figure 15:
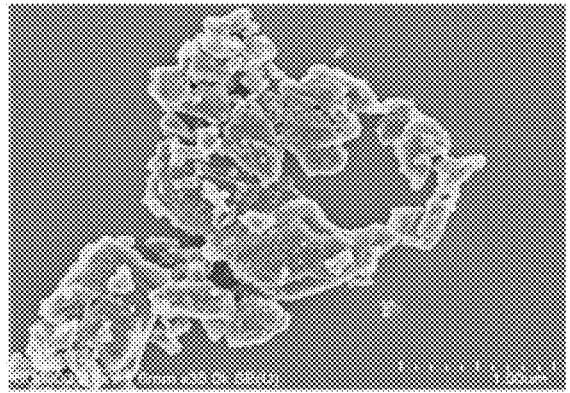

Moreover, the particulate material was classified from the IPA slurry by a method of leaving the IPA slurry naturally as it was for 48 hours. The flaky particulate material, which existed in the resulting supernatant liquid, was observed for form with an SEM, and was further measured for thicknesses and sizes by analyzing them with an AFM. Table 1 shows the results of the measurements. FIG. 15 shows the results of the observation.

Third Comparative Example

Figure 8:
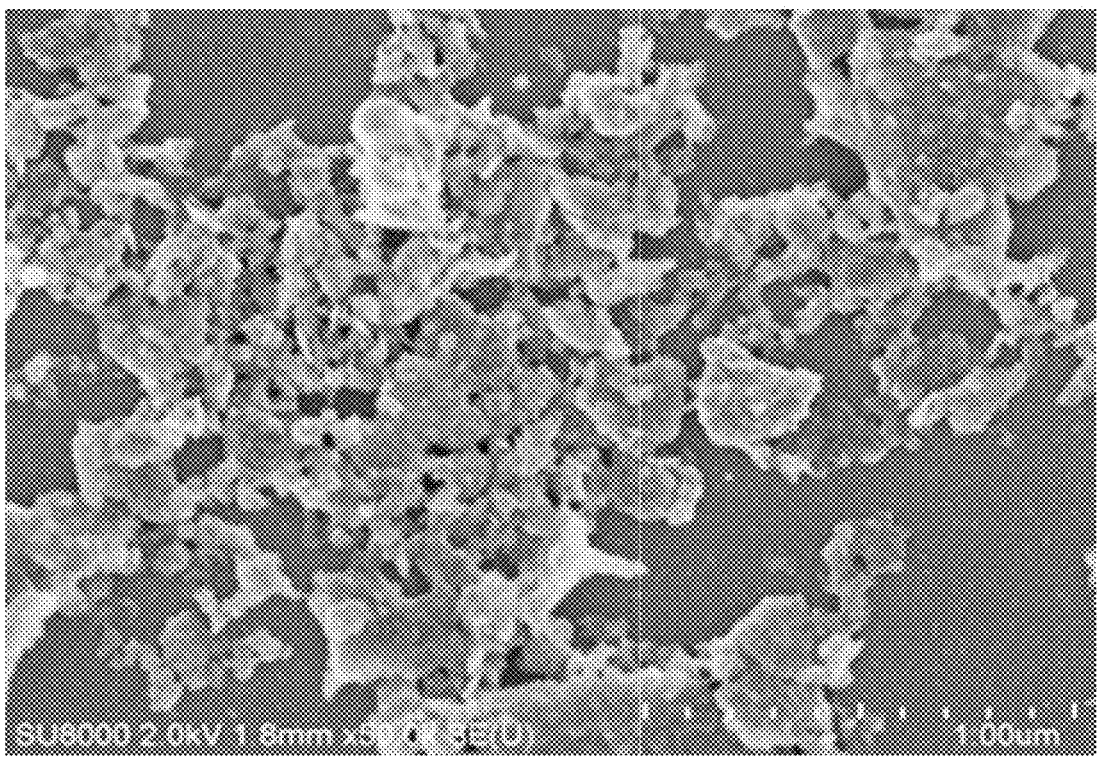
FIG. 8 is an SEM photograph of a particulate material according to Third Comparative Example.

Except for carrying out 20-round-passing bead milling using beads with 500 μm in bead diameter (e.g., "YTZ balls" produced by NIKKATO), a particulate material was made in the same manner as Eighth Example. The thus produced particulate material was measured for average values of sizes and thicknesses, Ti, Al, C and N contents, value of surface electric resistance, and true density; and the IPA slurry of the particulate material was further measured for an average particle diameter of the particulate material in the IPA; in the same manner as First Example. Table 1 shows the results of the measurements. FIG. 8 shows an SEM photograph of the particulate material after trying to exfoliate it by the bead milling using the beads with 500 µm in bead diameter.

Fourth Comparative Example

Figure 9:
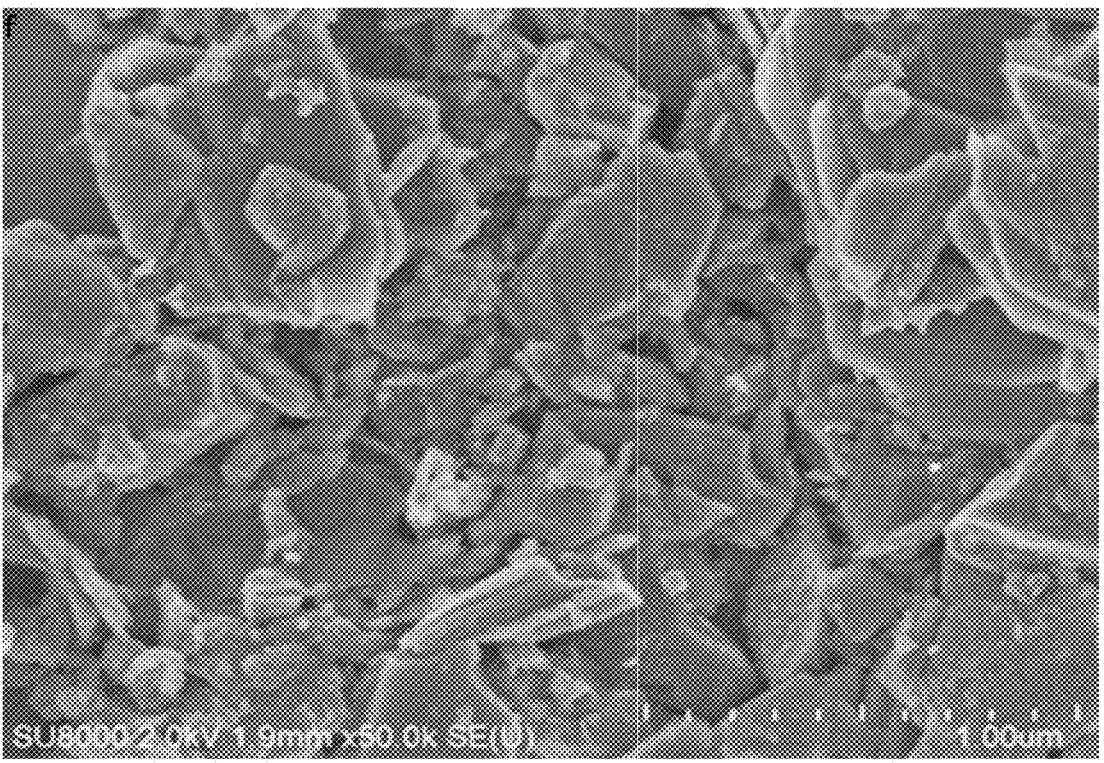
FIG. 9 is an SEM photograph of a particulate material according to Fourth Comparative Example.

Except for carrying out the exfoliation by 30-round-passing milling with a cross-nozzled wet jet mill operated at a pressure of 200 MPa, a particulate material was made in the same manner as First Comparative Example. The thus produced particulate material was measured for average values of sizes and thicknesses, Ti, Al and C contents, value of surface electric resistance, and true density; and the IPA slurry of the particulate material was further measured for an average particle diameter of the particulate material in the IPA; in the same manner as First Example. Table 1 shows the results of the measurements. FIG. 9 shows an SEM photograph of the particulate material after trying to exfoliate it with the wet jet mill.

Fifth Comparative Example

A $Ti_3AlC_2$ powder was made in the same manner as First Example. The resulting $Ti_3AlC_2$ powder was treated in a 10%-HF aqueous solution at a controlled aqueous-solution temperature of from 20° C. to 30° C. for 30 minutes at the pretreatment step, thereby making a particulate material in the same manner as Eighth Example. The thus produced particulate material was measured for average values of sizes and thicknesses, Ti, Al and C contents, value of surface electric resistance, and true density; and the IPA slurry of the particulate material was further measured for an average particle diameter of the particulate material in the IPA; in the same manner as First Example. Table 1 shows the results of the measurements.

Sixth Comparative Example

Except for charging a $Ti_3AlC_2$ powder slowly into a 300-mL mixed aqueous solution that contained 14.9-g KF in 6M HCl and thereafter leaving the $Ti_3AlC_2$ powder as it was in the mixed aqueous solution at an aqueous-solution temperature of from 35° C. to 40° C. while stirring the mixed aqueous solution for 30 hours, a particulate material was made in the same manner as Fifth Comparative Example. The thus produced particulate material was measured for average values of sizes and thicknesses, Ti, Al and C contents, value of surface electric resistance, and true density; and the IPA slurry of the particulate material was further measured for an average particle diameter of the particulate material in the IPA; in the same manner as First Example. Table 1 shows the results of the measurements.

Seventh Comparative Example

Figure 16:
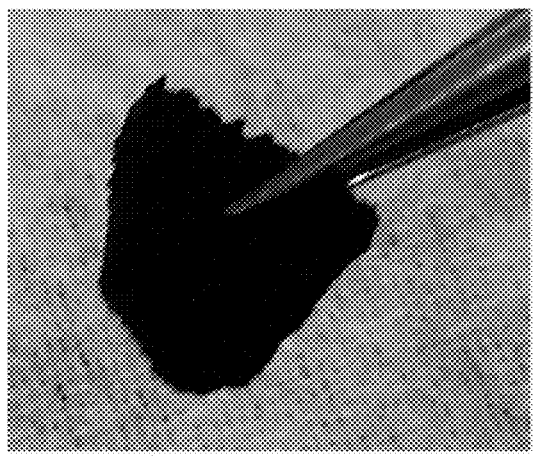
FIG. 16 shows a sheet according to Seventh Comparative Example in (a) an appearance photograph, and in (b) an SEM photograph.
Figure 16:
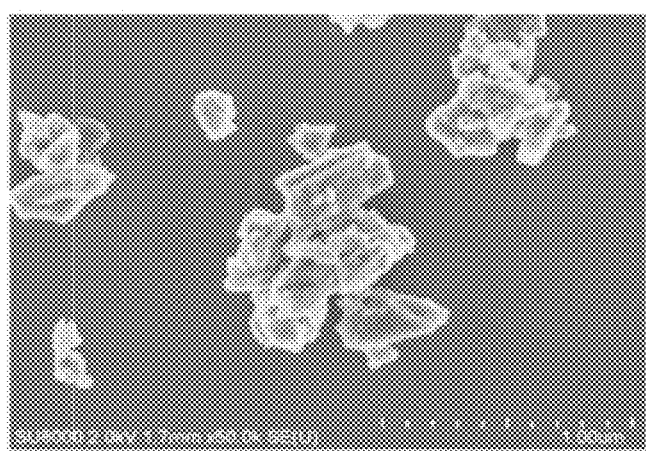

A particulate material was produced by subjecting 10 g of a $Ti_3AlC_2$ powder according to First Example to an acidic treatment with a 300-mL mixed aqueous solution that contained 14.9-g KF in 6M HCl and then to air-drying at room temperature after substituting IPA for water, the solvent. Thereafter, instead of the exfoliating operation by bead milling using beads with from 10 µm to 300 µm in bead diameter, a small amount of the thus produced particulate material was held between CELGARD membranes so that the particulate material was subjected to the application of stress with a roller, thereby fabricating a film according to Seventh Comparative Example. FIG. 16(a) shows a photograph of the thus fabricated film in the appearance. The resulting film was put into IPA, and was irradiated with an ultrasonic wave with 40 µm in amplitude, 19.5 kHz in frequency and 150 W in output for 30 minutes, thereby preparing a slurry in which the particulate material was uniformly dispersed in a liquid dispersant, namely, the IPA. The thus prepared slurry was dropped in a very small amount onto a wafer made of Si. After the slurry had been dried, the wafer was observed with an SEM for how the particulate material was exfoliated. FIG. 16(b) shows the observed result.

TABLE 1

| | Type of "MAX"-phase | Acidic-treatment Means | Exfoliation Means | Image by SEM | Thickness (µm) | Size (nm) | Composition | Surface Electric Resistance (Ω/□) | True Density | Submerged Average Particulate Diameter (nm) |
|---|---|---|---|---|---|---|---|---|---|---|
| 1st Ex. | $Ti_3AlC_2$ | A | 50 µm BM | FIG. 1 | 5.1 | 120 | $Ti_3Al_{0.1}{}^0C_{1.92}$ | 3.5 | 3.88 | 110 |
| 2nd Ex. | $Ti_3Al(C_{0.5}N_{0.5})_2$ | A | 50 µm BM | FIG. 2 | 9.8 | 120 | $Ti_3Al_{0.10}C_{0.96}N_{0.96}$ | 250 | 3.88 | 110 |
| 3rd Ex. | $Ti_3Al(C_{0.95}N_{0.1})_2$ | A | 50 µm BM | | 6.3 | 120 | $Ti_3Al_{0.10}C_{1.62}N_{0.18}$ | 23 | 3.88 | 110 |
| 4th Ex. | $Ti_2AlC$ | B | 50 µm BM | FIG. 3 | 4.3 | 100 | $Ti_2Al_{0.04}C_{0.91}$ | 4.1 | 3.42 | 110 |
| 5th Ex. | $Ti_2AlC$ | B | 50 µm BM | FIG. 4 | 4.3 | 100 | $Ti_2Al_{0.06}C_{0.91}$ | 5.6 | 3.42 | 110 |
| 6th Ex. | $Ti_2Al(C_{0.5}N_{0.5})$ | B | 50 µm BM | FIG. 5 | 4.5 | 110 | $Ti_2Al_{0.04}C_{0.45}N_{0.45}$ | 260 | 3.42 | 120 |
| 7th Ex. | $Ti_2Al(C_{0.9}N_{0.1})$ | B | 50 µm BM | | 4.4 | 110 | $Ti_2Al_{0.05}C_{0.79}N_{0.99}$ | 34 | 4.02 | 120 |
| 8th Ex. | $Ti_3Al(C_{0.5}N_{0.5})_2$ | C | 50 µm BM | | 15.0 | 130 | $Ti_3Al_{0.36}C_{1.06}N_{1.06}$ | 128 | 4.10 | 180 |
| 9th Ex. | $Ti_3Al(C_{0.5}N_{0.5})_2$ | C | 100 µm BM | | 9.5 | 200 | $Ti_3Al_{0.58}C_{1.07}N_{1.07}$ | 153 | 4.05 | 190 |
| 10th Ex. | $Ti_3Al(C_{0.5}N_{0.5})_2$ | C | 30 µm BM | | 5.8 | 250 | $Ti_3Al_{0.56}C_{1.11}N_{1.11}$ | 161 | 4.08 | 210 |
| 11th Ex. | $Ti_3AlN_2$ | C | 50 µm BM | | 4.2 | 160 | $Ti_3Al_{0.33}N_{2.07}$ | 300 | 4.45 | 120 |
| 1st Comp. Ex. | $Ti_3AlC_2$ | C | US | FIG. 6 | 989 | 990 | $Ti_3Al_{0.21}C_{2.08}$ | 18.3 | 4.45 | 1100 |
| 2nd Comp. Ex. | $Ti_3AlC_2$ | C | US | FIG. 7 | 955 | 950 | $Ti_3Al_{0.20}C_{2.07}$ | 17.4 | 4.40 | 1100 |
| 3rd Comp. Ex. | $Ti_3Al(C_{0.5}N_{0.5})_2$ | C | 500 µm BM | FIG. 8 | 150 | 150 | $Ti_3Al_{0.58}C_{1.20}N_{1.20}$ | 47 | 4.35 | 150 |
| 4th Comp. Ex. | $Ti_3AlC_2$ | C | WJ | FIG. 9 | 960 | 960 | $Ti_3Al_{0.62}C_{2.33}$ | 58 | 4.45 | 1200 |

TABLE 1-continued

| | Type of "MAX"-phase | Acidic-treatment Means | Exfoliation Means | Exfoliated Image by SEM | Form Thickness (μm) | Size (nm) | Composition | Surface Electric Resistance (Ω/□) | True Density | Submerged Average Particulate Diameter (nm) |
|---|---|---|---|---|---|---|---|---|---|---|
| 5th Comp. Ex. | $Ti_3AlC_2$ | D | 50 μm BM | | 2.3 | 110 | $Ti_3Al_{0.00}C_{2.00}$ | 480 | 3.35 | 80 |
| 6th Comp. Ex. | $Ti_3AlC_2$ | E | 50 μm BM | | 1.5 | 110 | $Ti_3Al_{0.00}C_{2.00}$ | 530 | 3.35 | 90 |
| 7th Comp. Ex. | $Ti_3AlC_2$ | C | Roller | FIG. 16 | 1320 | 1320 | $Ti_3Al_{0.36}C_{2.10}$ | 5.5 | 4.02 | 1500 |

(Acidic Treatment)
A: 10-g "MAX"-phase Ceramic Powder, in 300-mL Aqueous Solution with 18.0-g LiF and 12M-HCl, at from 20° C. to 30° C., and 24-hour Immersion;
B: 5-g "MAX"-phase Ceramic Powder, in 300-mL Aqueous Solution with 4.5-g LiF and 6M-HCl, at from 20° C. to 30° C., and 18-hour Immersion;
C: 10-g "MAX"-phase Ceramic Powder, in 300-mL Aqueous Solution with 14.9-g KF and 6M-HCl, at from 20° C. to 30° C., and 24-hour Immersion;
D: 10-g "MAX"-phase Ceramic Powder, in 300-mL Aqueous Solution with 10%-HF, at from 20° C. to 30° C., and 30-hour Immersion;
E: 10-g "MAX"-phase Ceramic Powder, in 300-mL Aqueous Solution with 14.9-g KF and 6M-HCl, at from 35° C. to 40° C., and 24-hour Immersion
(Exfoliation)
BM, US, and WJ designate bead milling, ultrasonic irradiation, and wet jet milling, respectively.

Results and Considerations

(1) On Method of Making "MAX"-Phase Ceramics (a) $Ti_3Al(C_{0.5}N_{0.5})_2$ was produced by making powder-compact fractured fragments by subjecting the raw material to CIP in a pressure range of from one ton/cm² to three ton/cm² and then calcining the powder-compact fractured fragments in an inert atmosphere whose temperature fell in a range of from 1,500° C. to 1,550° C. Setting the calcination temperature at 1,500° C. or more allowed inhibiting unreacted products and intermediate products from remaining, whereas setting it at 1,550° C. or less permitted recovering "MAX"-phase ceramics without decomposing them.

Regarding the conditions of making powder-compact fractured fragments from the raw material, making the powder compact much denser allowed the production of high-purity "MAX"-phase ceramics at a much lower calcination temperature. However, the removal of Al from the powder compact was less likely to develop at the acidic treatment step, and additionally flaky fragments became less likely to be exfoliated at the exfoliation step which was carried out by bead milling with beads having a bead diameter of from 10 μm to 300 μm. Thus, it was found that forms of the powder compact or conditions of making the powder compact may be selected properly depending on applications. Moreover, the present examples used CIP to make the powder compact, but the other method, such as uniaxial pressing performed under the pressure condition of from one ton/cm² to three ton/cm², also permits the powder compact to be made. In addition, for the electric resistance of the produced flaky particulate material, it is important that an "MAX"-phase ceramic powder has a single phase. For example, an "MAX"-phase ceramic powder having a phase mixed with Ti2-phase was found to be unfavorable, because it had undergone oxidation in the surface at the acidic treatment step to exhibit an increased electric resistance.

(b) $Ti_3AlC_2$ and $Ti_3Al(C_{0.9}N_{0.1})_2$ were produced by calcining the raw materials at a temperature falling in a range of from 1,400° C. to 1,450° C. in an inert atmosphere. Setting the calcination temperature at 1,400° C. or more allowed inhibiting unreacted products and intermediate products from remaining, whereas setting it at 1,450° C. or less permitted recovering "MAX"-phase ceramics without decomposing them.

(c) $Ti_2AlC$, $Ti_2Al(C_{0.5}N_{0.5})$ and $Ti_2Al(C_{0.9}N_{0.1})$ were produced by calcining the raw materials at a temperature falling in a range of from 1,300° C. to 1,350° C. in an inert atmosphere. Setting the calcination temperature to fall in the range of from 1,300° C. to 1,350° C., and further increasing the amounts of Ti and Al slightly were found to be able to inhibit the occurrence of unreacted products and the generation of Ti3-phase. Moreover, the conditions of making power-compact fractured fragments were the same as those in the production of $Ti_3Al(C_{0.5}N_{0.5})_2$.

2) On Chemical Composition and True Density of Produced Particulate Materials

Al was removed completely from a ceramic powder by a conventional technique where the ceramic powder was immersed in a 10%-or-more HF aqueous solution in a controlled aqueous-solution temperature range of from 20° C. to 30° C. for 24 hours or more at the pretreatment step of carrying out an acidic treatment. Moreover, Al was also removed completely from a ceramic powder by another conventional technique where the ceramic powder was even immersed in an (LiF+HCl) or (KF+HCl) aqueous solution at a temperature of from 35° C. to 45° C. for 24 hours or more. Both of the conventional techniques increased products in the electric resistance, because the acidic-treatment processes developed partial superficial oxidation in the products.

In contrast, under the conditions of immersing a ceramic powder in an (LiF+HCl) or (KF+HCl) aqueous solution at a temperature of from 20° C. to 30° C., obtained flaky particulate materials had remaining Al but exhibited a small electric resistance, because the superficial oxidation developed more moderately at the pretreatment step than at those according to the conventional techniques.

Therefore, it was found to be preferable to employ a condition under which Al is not completely removed but remains, because the condition allows the produced flaky particulate materials to exhibit a lowered electric resistance.

Moreover, although the following are not disclosed in detail, using carbon black as a carbon source in the starting raw material worsens produced "MAX"-phase ceramics in the crystallinity, and the acidic treatment has dissolved not only Al but also Ti in a large amount. It has been found that the proportion of C, $C_2$, $C_{(1.0-x)}N_x$ (where "x" is $0<"x"\leq 1.0$) or $(C_{(1.0-x)}N_x)_2$ (where "x" is $0<"x"\leq 1.0$) has heightened, as a consequence.

Meanwhile, it was revealed extremely difficult to exfoliate the particulate materials, which were immersed in an (LiF+HCl) or (KF+HCl) aqueous solution under the temperature condition from 20° C. to 30° C., by the conventional method of ultrasonic irradiation at the exfoliation step following the acidic treatment.

The "MAX"-phase ceramic powders had a true density of 4.16 g/cm³ for $Ti_2AlC$, 4.30 g/cm³ for $Ti_3AlC_2$, and 4.53 g/cm for $Ti_3Al(C_{0.5}N_{0.5})_2$. The $Ti_3AlC_2$ powder, which was immersed in the (KF+HCl) aqueous solution at from 35° C. to 45° C. for 24 hours, had a small true density of 3.35 g/cm³, and the $Ti_3AlC_2$ powder, which was immersed in the 10%-HF aqueous solution at from 20° C. to 30° C. for 24 hours, had a small true density of 3.35 g/cm³; whereas the $Ti_3AlC_2$ powder, which was immersed in the (LiF+HCl) aqueous solution at from 20° C. to 30° C. for 24 hours, had an increased true density of 3.88 g/cm³. Decreasing the CIP pressure in making "MAX"-phase ceramics decreased the resulting particulate materials in the true density; whereas increasing the CIP pressure increased them in the true density. This is because the more Al is removed from an "MAX"-phase ceramic powder the smaller the true density becomes; in other words, reducing the CIP pressure increases the removal amount of Al.

The $Ti_2AlC$ powder, which was immersed in the (KF+HCl) aqueous solution at from 35° C. to 45° C. for 24 hours, had a small true density of 3.35 g/cm³, and the $Ti_2AlC$ powder, which was immersed in the 10%-HF aqueous solution at from 20° C. to 30° C. for 24 hours, had a small true density of 3.35 g/cm³; whereas the $Ti_2AlC$ powder, which was immersed in the (LiF+HCl) aqueous solution at from 20° C. to 30° C. for 18 hours, had a slightly increased true density of 3.42 g/cm³.

(3) On Technique of Exfoliating Particulate Material

As a method of exfoliating particulate materials, it has been conventional to use methods by ultrasonic irradiation or rollers. According to investigations carried out by the present inventors for the exfoliation method by ultrasonic irradiation, it was found difficult to produce flaky particulate materials by exfoliation. In addition to the fact that the ultrasonic irradiation offered an extremely slow rate of exfoliating particulate materials at the interlayers, the ultrasonic irradiation did not at all exfoliate the particulate materials in some cases. Moreover, the method by rollers also hardly developed the exfoliation of particulate materials.

In addition, it was difficult even for a method by wet jet milling to exfoliate particulate materials. Meanwhile, it was found that subjecting particulate materials to bead milling using beads whose bead diameter is from 10 μm to 300 μm not only allows flaky fragments to be produced quickly in a uniform state; but also permits the produced flaky fragments to exhibit an average value of sizes obtained by an SEM image, namely, [{(longer sides)+(shorter sides)}/2], average value which is from 50 nm or more to 300 nm or less, and to exhibit an average value of thicknesses obtained by AFM analysis, average value which is from 3.5 nm or more to 20 nm or less.

In particular, adjusting the concentration of particles at from one to five mg/mL in a slurry and then carrying out the exfoliation step in an organic solvent allowed the preparation of a slurry whose particles were from 50 nm or more to 500 nm or less in agglomerated D50 diameter by volume percentage when measured in the organic solvent, and in which the particles were highly dispersed. In contrast to the above, carrying out bead milling using beads whose bead diameter was 500 μm developed the pulverization of particulate materials so that the particulate materials not fully exfoliated.

The comparative particulate materials, to which the exfoliation was attempted by irradiating them with the ultrasonic wave after the acidic treatment, were classified to make flaky particles by a method carried out conventionally in which not-exfoliated coarse particles were removed by leaving their slurries naturally as they were. The flaky particles exhibited an average value of 26.7 nm for the sizes and another average value of 4.2 nm for the thicknesses. Thus, the comparative particulate materials were confirmed to be unable to produce the flaky particulate material according to the present invention exhibiting an average value of from 50 nm or more to 300 nm or less for the sizes and another average value of from 3.5 nm or more to 20 nm or less for the thicknesses.

FIGS. 10, 11, 12, 13 and 14 illustrate XRD patterns of the flaky particulate materials, some of representative examples of the flaky particulate material according to the present invention, made in First, Second, Fourth, Fifth and Six Examples. For example, FIG. 10 illustrates that (002) planes shifted to lower angles; Al layers were removed; adhered superficial functional groups broadened an interplanar or lattice spacing from 0.923 nm to 1.360 nm between the (002) planes; and gap layers were formed to provide an interlayer distance of about 0.43 nm. Sodium ions or lithium ions stored between the gap layers enable the flaky particulate materials to be employed for sodium-ion secondary battery or lithium-ion secondary.

(3) On Slurry Containing Flaky Particulate Material

Using ethanol, IPA, other alcohols, N-methylpyrrolidone, methyl ethyl ketone, methyl isobutyl ketone, propylene glycol and monomethyl ether as a dispersion medium allowed the preparation of slurries in which the flaky particulate materials according to the examples of the present invention were dispersed in the liquid organic solvents.

What is claimed is:

1. A particulate material with a composition expressed by $M_aAl_bX_c$ in which "M" includes one or more elements selected from the group consisting of Ti, V, Cr, Zr, Nb, Mo, Hf and Ta and "X" includes C or one or more chemical structures represented by $C_{(1.0-x)}N_x$ (where "x" is 0<"x"≤1.0), wherein:
   "a" is two or three; "b" is more than 0.02; and "c" is from 0.8 to 1.2 when "a" is two; or "c" is from 1.8 to 2.6 when "a" is three; and
   the particulate material has thicknesses whose average value is from 3.5 nm or more to 20 nm or less, and sizes, [{(longer sides)+(shorter sides)}/2], whose average value is from 50 nm or more to 300 nm or less.

2. The particulate material according to claim 1, wherein: "M" includes Ti; and
   the composition satisfies any one of following (1) through (4):
   (1) "X" includes C, "a"=2, 0.65≥"b"≥0.03, and 1.2≥"c"≥0.8;
   (2) "X" includes $C_{(1.0-x)}N_x$ (where "x" is 0<"x"≤1.0), "a"=2, 0.65≥"b"≥0.03, and 1.2≥"c"≥0.8;
   (3) "X" includes C, "a"=3, 0.65≥"b"≥0.03, and 2.6≥"c"≥1.8; and
   (4) "X" includes $C_{(1.0-x)}N_x$ (where "x" is 0<"x"≤1.0), "a"=3, 0.65≥"b"≥0.03, and 2.6≥"c"≥1.8.

3. The particulate material according to claim 1 turned into a powder compact whose surface resistance is from 0.1Ω/☐ or more to 300Ω/☐ or less.

4. The particulate material according to claim 1, wherein:
"M" includes Ti; and
the particulate material satisfies any one of following (1) and (2):
(1) "X" includes C, and the particulate material has a true density of from 3.36 g/cm$^3$ to 3.50 g/cm$^3$ when "a" is two, or has a true density of from 3.70 g/cm$^3$ to 4.45 g/cm$^3$ when "a" is three; and
(2) "X" includes $C_{(1.0-x)}N_x$ (where "x" is 0<"x"≤1.0), and the particulate material has a true density of from 3.36 g/cm$^3$ to 3.50 g/cm$^3$ when "a" is two, or has a true density of from 3.70 g/cm$^3$ to 4.45 g/cm$^3$ when "a" is three.

5. A slurry comprising:
a particulate material according to claim 1; and
a liquid organic material dispersing the particulate material;
wherein the particulate material exhibits from 50 nm or more to 500 nm or less in D50 diameter by volume percentage in a particle size distribution when measured in the organic material.

6. A secondary battery comprising the particulate material according to claim 1 serving as an electrode active-material ingredient.

7. A transparent electrode comprising the particulate material according to claim 1 serving as an electrical conducting material.

8. A production process for particulate material, the production process comprising:
an exfoliation step of producing by an exfoliation process with a bead mill using beads from 10 μm to 300 μm in size a particulate material, which has thicknesses whose average value is from 3.5 nm or more to 20 nm or less, and sizes, [{(longer sides)+(shorter sides)}/2], whose average value is from 50 nm or more to 300 nm or less, from a raw material with a composition expressed by $M_aAl_bX_c$ in which "M" includes one or more elements selected from the group consisting of Ti, V, Cr, Sc, Zr, Nb, Mo, Hf and Ta and "X" includes C or one or more chemical structures represented by $C_{(1.0-x)}N_x$ (where "x" is 0<"x"≤1.0), wherein:
"a" is two or three; "b" is more than 0.02; and "c" is from 0.8 to 1.2 when "a" is two; or "c" is from 1.8 to 2.6 when "a" is three; and
the particulate material has thicknesses whose average value is from 3.5 nm or more to 20 nm or less, and sizes, [{(longer sides)+(shorter sides)}/2], whose average value is from 50 nm or more to 300 nm or less.

9. The production process for particulate material according to claim 8, the production process further comprising:
a pretreatment step of removing some of contained aluminum (Al) elements by reacting an acidic substance, which is composed of a combination of a fluoride salt and hydrochloric acid and is put in a controlled state of from 20° C. to 30° C., with an "MAX"-phase ceramic powder with a composition expressed by $M_aAl_dX_c$ in which "M" includes one or more elements selected from the group consisting of Ti, V, Cr, Sc, Zr, Nb, Mo, Hf and Ta and "X" includes C or one or more chemical structures represented by $C_{(1.0-x)}N_x$ (where "x" is 0<"x"≤1.0), wherein: "a" is two or three; "d" is one; and "c" is one when "a" is two; or "c" is two when "a" is three, thereby producing the raw material.

* * * * *